(12) United States Patent  
Filley

(10) Patent No.: US 10,749,807 B2  
(45) Date of Patent: Aug. 18, 2020

(54) WIRELESS NETWORK OPTIMIZATION

(71) Applicant: HERE Global B.V., Eindhoven (NL)

(72) Inventor: George Filley, Deer Park, IL (US)

(73) Assignee: HERE Global B.V., Eindhoven (NL)

( * ) Notice: Subject to any disclaimer, the term of this patent is extended or adjusted under 35 U.S.C. 154(b) by 4 days.

(21) Appl. No.: 15/251,302

(22) Filed: Aug. 30, 2016

(65) Prior Publication Data  
US 2018/0063002 A1 Mar. 1, 2018

(51) Int. Cl.  
H04L 12/801 (2013.01)  
H04L 12/24 (2006.01)  
G08G 1/01 (2006.01)  
G08G 1/04 (2006.01)  
G06Q 50/30 (2012.01)  
H04W 4/021 (2018.01)  
H04W 16/22 (2009.01)  
H04W 24/02 (2009.01)

(52) U.S. Cl.  
CPC .......... H04L 47/127 (2013.01); G06Q 50/30 (2013.01); G08G 1/012 (2013.01); G08G 1/0112 (2013.01); G08G 1/0116 (2013.01); G08G 1/0129 (2013.01); G08G 1/0133 (2013.01); G08G 1/0141 (2013.01); G08G 1/04 (2013.01); H04L 41/0896 (2013.01); H04L 41/147 (2013.01); H04W 4/021 (2013.01); H04W 16/22 (2013.01); H04W 24/02 (2013.01)

(58) Field of Classification Search  
CPC ..................................................... H04L 47/127  
USPC ........................................................ 455/456.1  
See application file for complete search history.

(56) References Cited

U.S. PATENT DOCUMENTS

| 5,384,926 A | 1/1995 | Al-Bargi |
| 9,247,523 B1 | 1/2016 | Bhatia et al. |
| 9,332,387 B2 | 5/2016 | Davis et al. |
| 9,928,741 B2 * | 3/2018 | Harris ................. G08G 1/0967 |
| 2004/0080430 A1 | 4/2004 | Videtich |
| 2008/0186027 A1 | 8/2008 | Kassai |
| 2009/0005968 A1 | 1/2009 | Vengroff et al. |
| 2009/0143046 A1 * | 6/2009 | Smith ................... H04W 72/10 |
| | | 455/404.1 |

(Continued)

FOREIGN PATENT DOCUMENTS

| DE | 2714695 A1 | 10/1978 |
| DE | 4229998 A1 | 3/1994 |

(Continued)

OTHER PUBLICATIONS

PCT International Search Report and Written Opinion of the International Searching Authority dated Dec. 8, 2016 for corresponding PCT/EP2016/073151.

(Continued)

Primary Examiner — Chuck Huynh  
(74) Attorney, Agent, or Firm — Lempia Summerfield Katz LLC

(57) ABSTRACT

Methods and apparatuses are provided for optimizing a wireless network. A description of a traffic incident is received. An impact area is generated from the description. A geographic polygon is generated based on the impact area. The network usage of the geographic polygon is determined. A message including the network usage for the geographic polygon may be transmitted to a mobile network operator.

16 Claims, 15 Drawing Sheets

(56) References Cited

U.S. PATENT DOCUMENTS

| | | | |
|---|---|---|---|
| 2009/0233575 A1* | 9/2009 | Morrison | G08G 1/096725 455/404.2 |
| 2009/0247186 A1 | 10/2009 | Ji et al. | |
| 2010/0015926 A1* | 1/2010 | Luff | H04L 41/0604 455/67.13 |
| 2011/0223881 A1 | 9/2011 | Brok den et al. | |
| 2016/0028648 A1 | 1/2016 | Wohlert et al. | |
| 2016/0036917 A1* | 2/2016 | Koravadi | G01C 21/3415 701/2 |
| 2017/0270413 A1* | 9/2017 | Moreira-Matias | G06N 99/005 |

FOREIGN PATENT DOCUMENTS

| | | |
|---|---|---|
| EP | 0443174 A1 | 8/1991 |
| EP | 0973182 A2 | 1/2000 |
| EP | 3054721A1 A1 | 8/2016 |
| WO | 8200247 A1 | 2/1982 |
| WO | WO2015012748 A1 | 1/2015 |

OTHER PUBLICATIONS

PCT International Search Report and Written Opinion of the International Searching Authority dated Oct. 20, 2017 for corresponding PCT/US2017/047904.

Qualcomm Incorporated et al: "Usage Examples and Explanation of CR on Location Filtering", 3GPP Draft; S4-AHI326, 3rd Generation Partnership Project (3GPP), Mobilecompetence Centre ; 650, Route Deslucioles, Sep. 18, 2012, Retrieved from the Internet: URL: http:// www.3gpp.org /ftp /tsg_sa /WG4_CODEC/Ad-hoc MBS/ Docs AHI/.

Steenbruggen John et al: "Traffic incidents in motorways: An empirical proposal for incident detection using data from mobile phone operators", Journal of Transport Geography, Pergamon, Amsterdam, NL, vol. 54, May 31, 2016 (May 31, 2016), pp. 81-90.

Abou-zeid, Hatem. Predictive Radio Access Networks for Vehicular Content Delivery. Diss. Queen's University, 2014.

German Office Action in corresponding German Patent Application No. DE 10 2014 205 837.6, dated Nov. 18, 2014 with English translation.

Scroxton, A. (May 21, 2015). Connected cars driving into mobile traffic jams. Retrieved Aug. 30, 2016, from http://www.computerweekly.com/news/4500246736/Connected-cars-driving-into-mobile-traffic-jams?src=itke stub.

PCT International Search Report and Written Opinion of International Searching Authority dated Mar. 5, 2019, corresponding to PCT International Application No. PCT/EP2017/047904 filed Aug. 22, 2017.

European Office Action for European Patent Application No. 17 761 654.7-1216 dated Jun. 2, 2020.

* cited by examiner

US 10,749,807 B2

WIRELESS NETWORK OPTIMIZATION

FIELD

The following disclosure relates to transportation systems and transit related applications, and more specifically to receiving events, determining an impact area, and calculating network loads.

BACKGROUND

As usage of connected devices increase, wireless networks that were intended to support only a few devices, now support many more connected devices. In addition, the connected devices may be running bandwidth intensive applications such as streaming video. When designing a wireless network, a mobile network operator (MNO) may use a peak bandwidth of all the devices to allocate network equipment for each area. If the peak bandwidth is defined by normal operation, incidents that cause an unexpected congestion of connected devices may result in the wireless network dropping or ignoring requests. If the peak bandwidth is based on special or isolated incidents, for normal operation, the capacity above the average usage is wasted bandwidth that may go unused. If a MNO can identify the incidents ahead of time and take preemptive action, the peak bandwidth may be defined closer to normal operation saving vast amounts of network equipment that would otherwise be deployed.

SUMMARY

In an embodiment, a method is provided for optimizing a wireless network. A description of a traffic incident is received. A geographic polygon is generated based on the description. An estimated network usage is calculated for the geographic polygon. The estimated network usage is transmitted to a mobile network operator.

In an embodiment, an apparatus is provided for optimizing a wireless network. The apparatus comprises at least one processor and at least one memory. The apparatus is configured to receive a description of an incident. The apparatus generates a first impact area based on the description and a first geographic polygon based on the first impact area. The apparatus generates a first bandwidth level for the a first geographic polygon. The apparatus generates a second impact area for a second time period based on the description. The apparatus generates a second geographic polygon and a second bandwidth level. The first and second bandwidth levels are transmitted to a mobile network operator.

In an embodiment, a method if provided for optimizing a wireless network. A description of an incident is received. An impact area is determined. A network data congestion level is determined for the impact area. One or more cells that are associated with the network data level congestion level are identified. A message is transmitted to one or more devices predicted to traverse the one or more cells.

BRIEF DESCRIPTION OF THE DRAWINGS

Exemplary embodiments of the present invention are described herein with reference to the following drawings.

DETAILED DESCRIPTION

Embodiments are provided that assist in designing and managing an efficient wireless network by identifying and predicting network usage based on traffic events. Wireless networks may be managed based on information relating to connected devices flowing through the wireless network. Network utilization requirements may be based on the information including the number and the usage profiles of the connected devices. The information may be used to create an infrastructure and support the connected devices through peak network demands. By estimating the number of devices and their usage that result from traffic events, the wireless network may be managed to efficiently balance the network loads using preemptive methods.

Figure 1A:
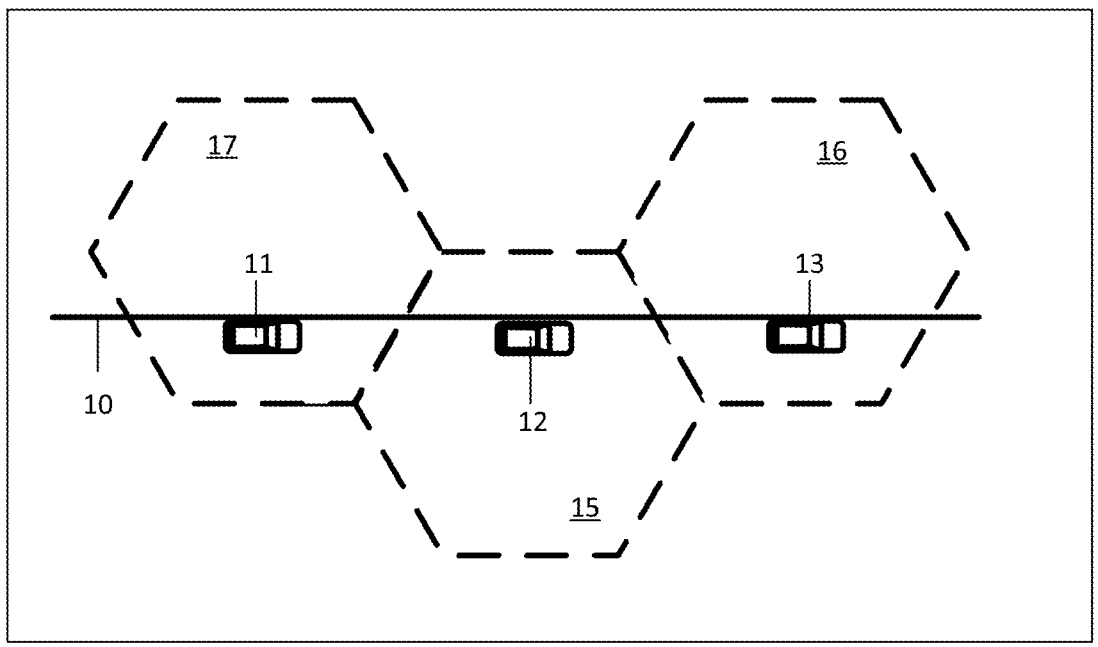
FIGS. 1A and 1B illustrate an example of a wireless network covering a roadway network.
Figure 1B:
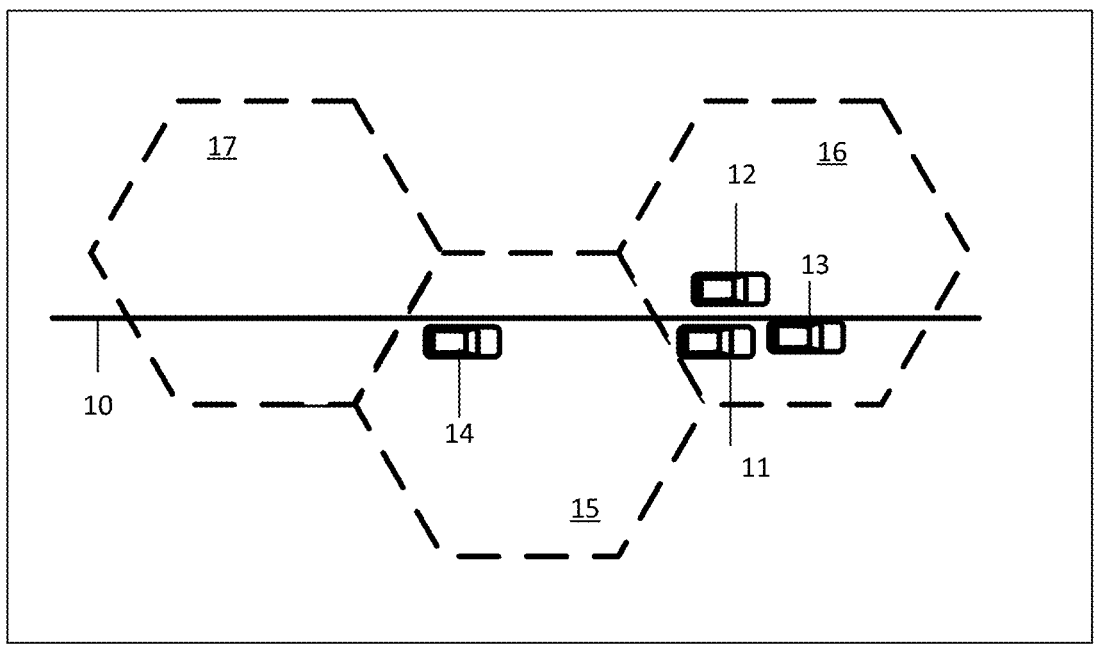

FIGS. 1A and 1B illustrates an example of a wireless network covering a roadway network. FIGS. 1A and 1B include three connected devices 11, 12, and 13 represented by the vehicles. The connected devices 11, 12, 13 transmit and request information though a wireless cellular network. The wireless cellular network includes a plurality of cells. FIGS. 1A and 1B also include three cells 15, 16, and 17. Each of the cells 15, 16, 17 may be serviced by one or more towers, base stations, and or network equipment. While there may be overlap between the cells, each cell may handle the data load for every device inside the cell. As such, each cell provides bandwidth for a maximum expected number of users.

The roadway 10 passes through each of the cells 15, 16, and 17. As the connected devices 11, 12, and 13 pass through the cells 15, 16, and 17 the connected devices 14 communicate with the respective base stations in each cell 15, 16, 17. For FIG. 1A, the connected devices are spaced about equally along the roadway 10. Connected device 11 communicates using the first cell 17. Connected device 12 communicates using cell 15; connected device 13 communicates using cell 16. If the vehicles were spaced equally apart, the base stations may only have to communicate with one device at any point in time. The wireless network could be designed to only support a maximum of one device at a time. The example here using one connected device, however, in the real world, the base stations may support hundreds or thousands of connected devices at any time.

In FIG. 1B, the connected devices 11, 12, and 13 have bunched up in cell 16. Each of the connected device 11, 12, and 13 uses cell 16 to communicate. The congestion in cell 16 may be caused by, for example, an accident or construction along the roadway 10. As a result of the congestion, it is apparent that cell 16 may be required to provide wireless networking to at least three connected devices, increase the maximum required bandwidth from the example in FIG. 1A by three times. In addition, due to the congestion, each connected device may be transmitting and requesting more information than normal. An autonomous vehicle, for example, may require additional map data to recognize any alternation in the roadway 10. Further, as the incident that caused the congestion in cell 16 may occur at any point along the roadway 10, each cell 15, 16, and 17 may be required to support the maximum bandwidth of the three devices at all times, creating a surplus of bandwidth during normal operation. As illustrated in FIG. 1B, the cell 15 and 17 are underutilized.

A solution to the bandwidth issues is to design the wireless network to preemptively transmit data to connected devices that are going to enter a crowded cell in order to lighten the load on that cell. In the examples of FIGS. 1A and 1B, each cell may be designed to support two connected devices. The example in FIG. 1B would overload cell 16 in such a circumstance. However, if the wireless network was able to recognize that congestion was occurring or going to occur in cell 16, the wireless network could preemptively use cells 15 and 17 to download or transmit data to connected devices 11, 12, and 14 that are expected to enter cell 16. Accordingly, once the connected devices 11, 12, and 14 do enter cell 16, the connected devices 11, 12, and 14 may generate fewer requests and take up less bandwidth allowing cell 16 to be managed with equipment that is only capable of supporting bandwidth for two devices. The saving for each cell may be minor, but multiplied across the entire network the benefit is substantial. Optimizing an existing wireless network as such may also delay the need to upgrade or replace equipment.

The following embodiments relate to a reception of events (e.g. from vehicles or roadside sensors), filtering, processing, and transmission of messages to mobile network operators (MNOs). The embodiments take advantage of accurate maps, real-time and historical traffic flow information and analytics to determine the impact that an incident will have. The resulting analysis generates a geographic polygon based on the area and roads that will be impacted by the incident. The predicted network usage of the geographic polygon may be determined based on historical network usage information. Preemptive actions may be taken to balance the usage of the network based on the predicted network usage and event data. The polygon and predicted network usage, has continuously updated parameters, defined by ongoing impact analytics, based on the nature of the incident and the impact it will have over time, that predict future network usage and requirements.

The disclosed embodiments may be implemented to optimize managing a wireless network leading to an improvement in the computational system. The embodiments improve the efficiency and function of the cellular network of a MNO. The increased efficiency and usage of resources may lead to less setup (fewer pieces of equipment), fewer communication errors, and less maintenance of the wireless network.

Figure 2:
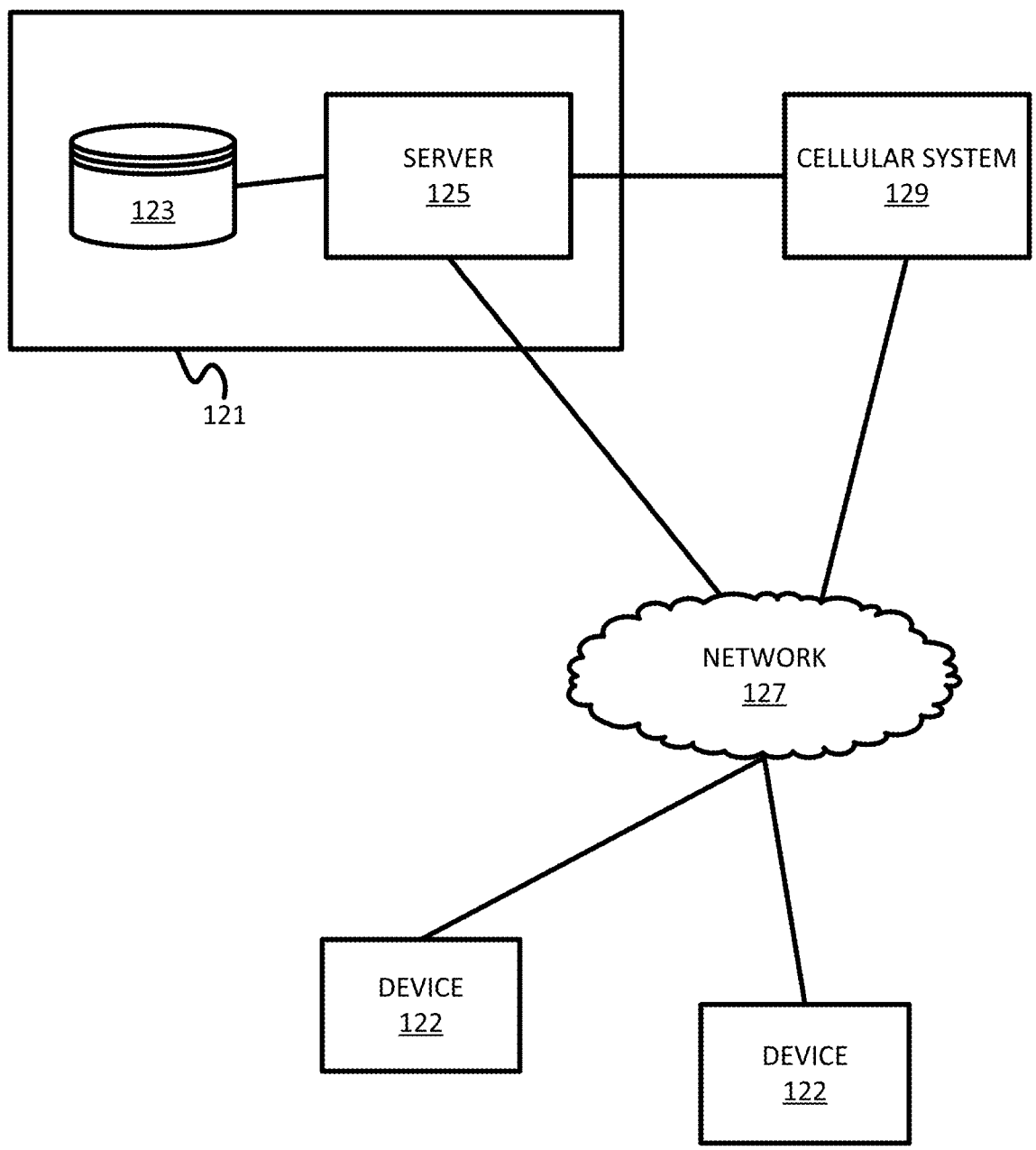
FIG. 2 illustrates an example system for optimizing a wireless network.

FIG. 2 illustrates an example system for optimizing a wireless network. The system includes one or more devices 122, a network 127, a cellular system 129, and a location cloud 121. The device(s) 122 are coupled with or wirelessly connected to the network 127 that are coupled with or wirelessly connected to both the cellular system 129 and the location cloud 121. The location cloud 121 is coupled with the cellular system 129. Herein, the phrase "coupled with" is defined to mean directly connected to or indirectly connected through one or more intermediate components. Such intermediate components may include both hardware and software based components. Additional, different, or fewer components may be included. For example, in certain embodiments, system may include additional or different components such as a traffic management center. The cellular system 129 may include the network 127 or may manage a part of the network 127.

The device(s) 122 (also referred to as a connected device 122) may be a mobile device or a sensor that provides samples of data for the location of the device 122 or a vehicle. The device(s) 122 may be mobile phones running specialized applications that collect location data as people travel roads as part of their daily lives. The device(s) 122 may also be integrated in or with a vehicle. Applications, computer sub-systems or sensors that are either standard or optional equipment on a vehicle may collect and aggregate information regarding the operation of the vehicle. The device(s) 122 may also be a sensor or a collection of sensors, such as an inductance loop or optical detector (e.g., camera, light detection and ranging (LiDAR), or radar device). The device(s) 122 may be a camera/imaging sensor for gathering image data (e.g., the camera sensors may automatically capture traffic flow information, abnormal incidents, and/or traffic light information. The device(s) may be sensors located on the perimeter of the vehicle in order to detect the relative distance of the vehicle from lane or roadways, the presence of other vehicles, pedestrians, traffic lights, potholes and any other objects, or a combination thereof. In one scenario, the sensors may detect weather data, traffic information, or a combination thereof.

The device(s) 122 and/or other sensor(s) may be the means for collecting data from one or more vehicles and aggregating the data into event data including vehicle data or road condition data. The data may be transmitted over the network or through the cellular system 129. The device(s) 122 may also be configured to receive data from the cellular system 129 through the network and or location clouds connected to it. The received data may include routing or navigation data, video data, audio data, or data relating to the device or vehicle.

A cellular system 129 may include one or more cellular network managers and one or more cellular boundary generators. The devices 122 may communicate with the cellular system 129 using the network 127. The cellular system 129 may be operated by a MNO. An MNO may be a wireless service provider. The MNO may control the equipment necessary for a wireless or cellular system to operate. The MNO may provide wireless communications to a plurality of subscribers. The cellular system 129 may include one or more cells including one or more pieces of network equipment. In certain embodiments, the network equipment and cellular structure may be part of the network 127 and controlled by the cellular system 129.

The cellular system 129 may be the means for identifying and storing network usage for the entire network and or one or more of the cells. The cellular system 129 may store usage profiles for subscriber or connected device 122. The cellular system 129 may identify and store network usage patterns. The cellular system 129 may be configured to receive information relating to a traffic event and or changes in weather or conditions affecting mobility, from the location cloud 121, and generate preemptive actions to balance or shift network traffic from one cell to another.

The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network such as Digital Short Range Communications (DSRC/802.11P). Further, the network 127 may be a public network, such as the Internet, a private network, such as an intranet, or combinations thereof, and may utilize a variety of networking protocols now available or later developed including, but not limited to TCP/IP based networking protocols. The network 127 may be the means for transmission of data between the devices 122, the cellular system 129, the location cloud 121, and/or other equipment or devices in the system.

The location cloud 121 may include one or more servers, workstations, databases, and other machines connected together and maintained by a manager of connected vehicle data, including but not limited to map, sensor, wireless network, temporal climate and incident data. The location cloud 121 (or traffic management system) may include one or more server(s) 125 such as a sensor ingestion server, a traffic management server, and/or an analytics server. The location cloud 121 may also include a database 123. The location cloud 121 may be configured to provide up to date information and maps to external map databases or mapping applications. The location cloud 121 collects or ingests data from multiple sources, such as through the network 127, in order to maintain up to date roadway conditions. Data such as sensor data, weather, road conditions, traffic flow, and historical data is processed to determine current and future traffic conditions.

The location cloud 121 may be the means for determining an incident type, an incident location, an impact area, and an incident duration from the collected data. The location cloud 121 updates the incident as additional data is collected and the incident evolves over time. The term location cloud 121 is used herein to collectively include the ingestion, analytic/computational, interface API's and message distribution capabilities residing in both local and cloud based systems including the systems used for creating, maintaining, accessing, and updating one or more database(s) 123.

The location cloud 121 may receive information relating to the network usage from the cellular system 129, the network 127, or the devices 122. The network usage information may be real-time data or historical data. The location cloud 121 may be configured to estimate or predict current or future network usage based on an impact of a traffic event and the network usage information. The location cloud 121 may store the estimated or predicted network usage in the database 123. The location cloud 121 may generate messages for transmission to devices 122 describing preemptive actions to be taken to avoid over congested cells.

The database 123 (also referred to as a dynamic content database, sensor ingestion database, traffic database, map database or geographic database) may include geographic data used for network, traffic and/or navigation-related applications.

Figure 3:
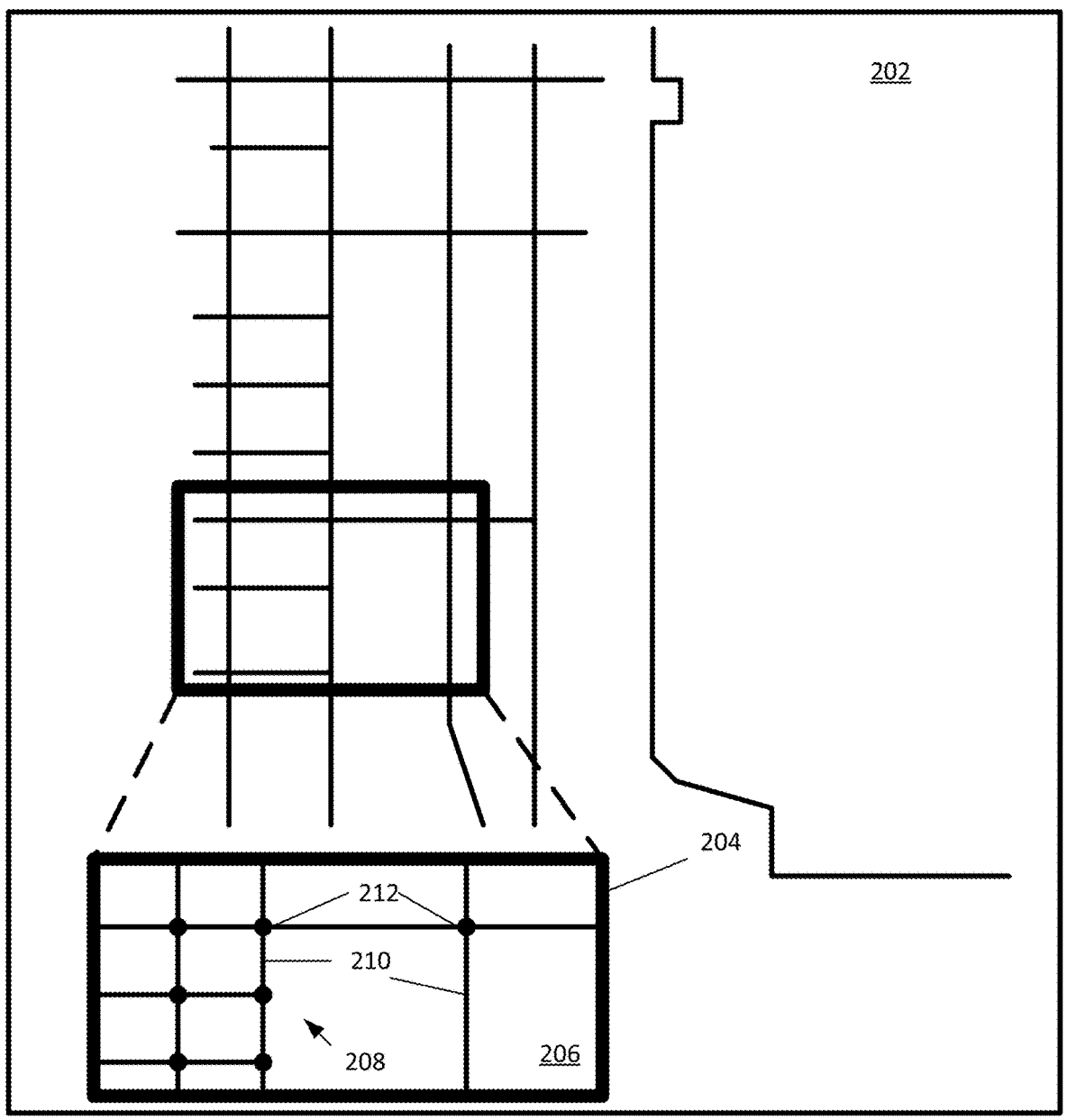
FIG. 3 illustrates an example map of a geographic region.

In order to provide navigation-related features and functions to the end user, the mapping system 121 uses the geographic database 123. The geographic database 123 includes information about one or more geographic regions. FIG. 3 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with the road segment 210, two nodes 212; one node represents the point at one end of the road segment and the other node represents the point at the other end of the road segment. The node 212 at either end of a road segment 210 may correspond to a location at which the road meets another road, i.e., an intersection, or where the road dead-ends.

Figure 4:
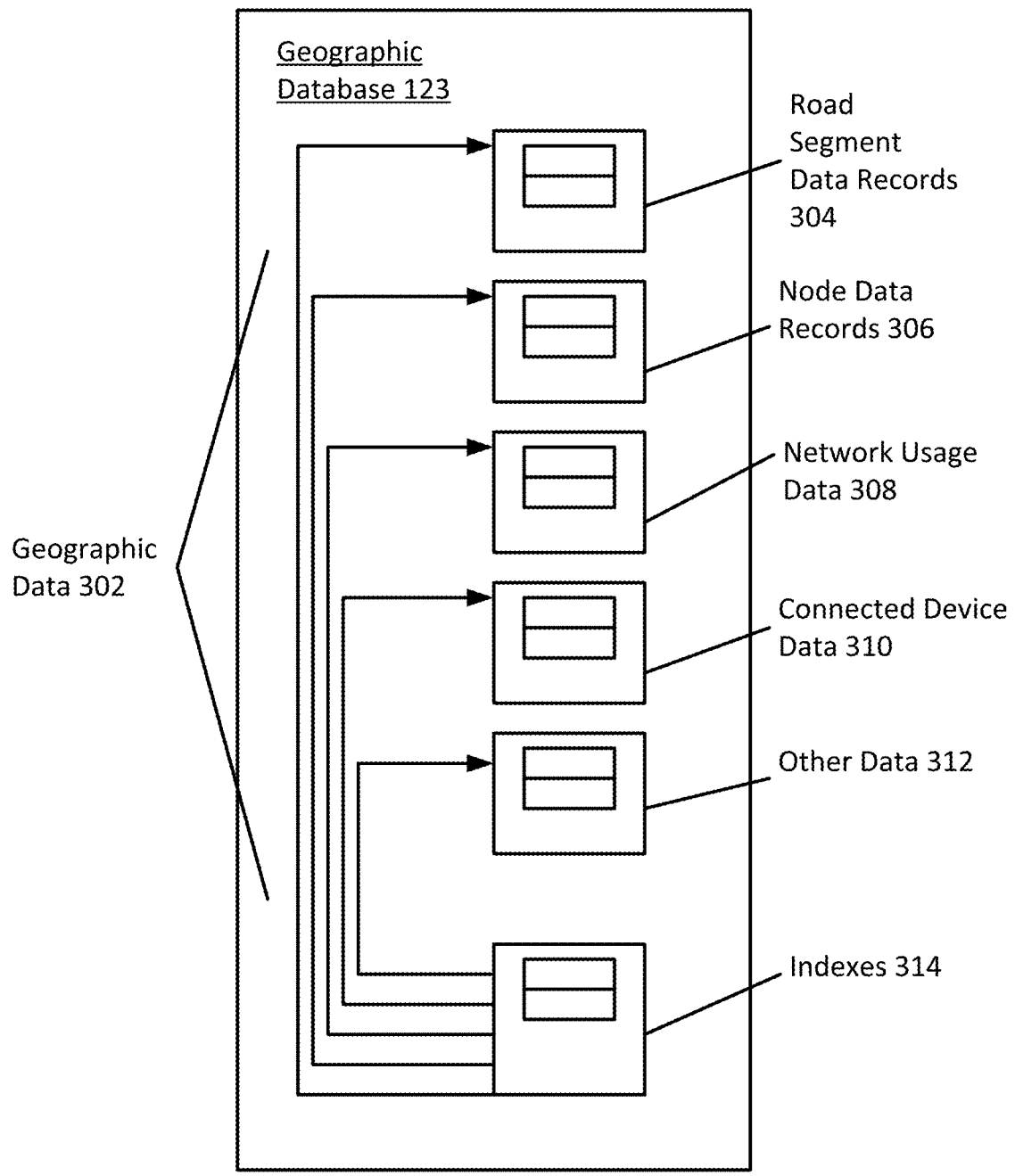
FIG. 4 illustrates an example geographic database of FIG. 2.

FIG. 4 depicts an example geographic database 123. The geographic database 123 contains data 302 that represents some of the physical geographic features in the geographic region 202 depicted in FIG. 3. The data 302 contained in the geographic database 123 may include data that represent the road network 208. In the embodiment of FIG. 4, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing the physical geographic features, and other terminology for describing the features is intended to be encompassed within the scope of the concepts.

The geographic database 123 may also include other kinds of data 312. The other kinds of data 312 may represent other kinds of geographic features or anything else. The other kinds of data may include point of interest data. For example, the point of interest data may include point of interest records including a type (e.g., the type of point of interest, such as restaurant, hotel, city hall, police station, historical marker, ATM, golf course, etc.), location of the point of interest, a phone number, hours of operation, etc. The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 5:
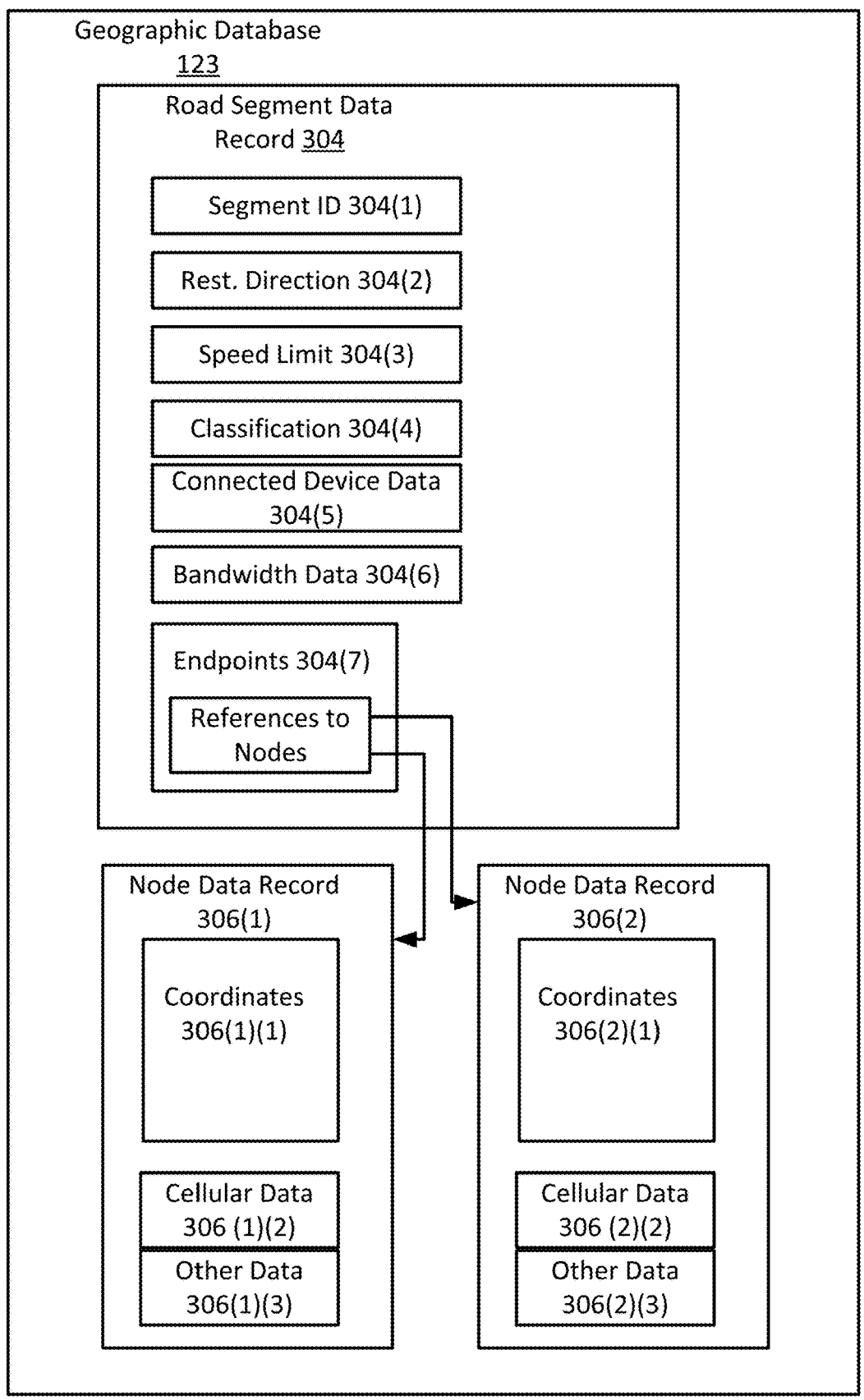
FIG. 5 illustrates example components of the geographic database of FIG. 4.

FIG. 5 depicts some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on.

Data for network usage, bandwidth restrictions, or connected devices 122 may be stored as separate records 308, 310 or in road segment data records 304. The network usage data 308 and connected device data 310 may include data such as network usage or profile data for one or more connected devices 122. The records 308 may include data relating to one or more cells of a cellular network. The data for the one or more cells may include capacity for each cell as it relates to other information in the geographic database such as road segment data records 304. The geographic database 123 may include road segment data records 304 (or data entities) that describe features such as number of devices 304(5) or bandwidth estimations 304(6). The estimated bandwidth or peak bandwidth may be stored as a field or record using a scale of values such as from 1 to 100 (1 representing low bandwidth, 100 representing high bandwidth), a value relating to throughput, or based on a measurement scale such as data per second (Mb/s, Gb/s) or range thereof. The estimated bandwidth may be stored using categories such as low, medium, high. The estimated network usage or bandwidth may be received from the cellular system 129. The estimated network usage or bandwidth may be derived from the number of expected vehicles that may be derived from traffic flow and/or number of sensor vehicle identified on a road segment. The estimated network usage or bandwidth may be stored for different time periods or events. For example, an estimated network usage for a road segment may be stored for 15 minute increments over a day (for each day of the week). The estimated network usage may be stored for particular events such as construction or accidents. Additional schema may be used to describe the estimated network usage or bandwidth. The geographic database 123 may store other data 310 relating to network usage such as data relating to non-vehicular connected devices 122. The connected device data 310 may store user profiles or estimated data usage for individual or groups of connected devices 122. The connected device data 310 may store usage patterns for connected devices 122 for different locations or time periods. Additional geographic and network usage data may be stores in other data 312. The attribute data may be stored in relation to a link/segment 304, a node 306, a strand of links, an area, or a region.

The geographic database 123 may store information or settings for display preferences. The geographic database 123 may be coupled to a display. The display may be configured to display the roadway network and data entities using different colors or schemes. The geographic database 123 may store information relating to where bandwidth issues conditions may exist, for example, though analysis of the data records, current/historical traffic conditions, cellular information, and cellular maps. Road segments with limited bandwidth or approaching a bandwidth peak may be used to identify or supplement other data entities such as potential hazards. Network usage or bandwidth data records along with geographic data records may indicate through a combination of conditions that location on a roadway is not safe.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record that cross-references to each other. For example, the road segment data record 304 may include data identifying what turn restrictions exist at each of the nodes that correspond to intersections at the ends of the road portion represented by the road segment, the name or names by which the represented road segment is known, the street address ranges along the represented road segment, and so on.

FIG. 5 also shows some of the components of a node data record 306 that may be contained in the geographic database 123. Each of the node data records 306 may have associated information (such as "attributes", "fields", etc.) that allows identification of the road segment(s) that connect to it and/or a geographic position (e.g., its latitude and longitude coordinates or location in a cellular map or network). For the embodiment shown in FIG. 5, the node data records 306(1) and 306(2) include the latitude and longitude coordinates 306(1)(1) and 306(2)(1) for their node. The node data records include the cellular data 306(1)(2) and 306(2)(2). The cellular data for each node may store signal strength, number of connected device at a time period. The cellular data may include the number and types of wireless network equipment at the node or within a certain distance. The cellular data may include thresholds for capacity or bandwidth. The node data records 306(1) and 306(2) may also include other data 306(1)(3) and 306(2)(3) that refer to various other attributes of the nodes. The node data records, for example, may store network data usage, such as bandwidth or number of connected devices.

The geographic database 123 may be maintained by a content provider (e.g., a map developer). By way of example, the map developer may collect geographic data to generate and enhance the geographic database 123. The map developer may obtain data from sources, such as businesses, municipalities or respective geographic authorities. In addition, the map developer may employ field personnel to travel throughout the geographic region to observe features and/or record information about the roadway. Remote sensing, such as aerial or satellite photography, may be used. The geographic database 123 may receive data from a cellular system 129 relating to the network usage or bandwidth for a road segment, a cell, or an area. The geographic database 123 may store one or more cellular maps that correspond to a wireless coverage area of one or more cellular networks operating by one or more MNOs. The cellular maps may include the configuration of the equipment in each cell of the cellular maps including information such as the transmission capacity of each cell.

The geographic database 123 may store data relating to an impact area of a traffic event. The geographic database 123 may store generated polygons for different types of traffic events and information relating to how the generated polygons change over time. The geographic database 123 may store information relating to how the traffic event affects network usage inside the generated polygon.

The geographic database 123 and the data stored within the geographic database 123 may be licensed or delivered on-demand. Other navigational services or MNOs may access the traffic data and the network usage data stored in the geographic database 123. Data including the network usage data for a link or cell may be broadcast as a service.

Figure 6:
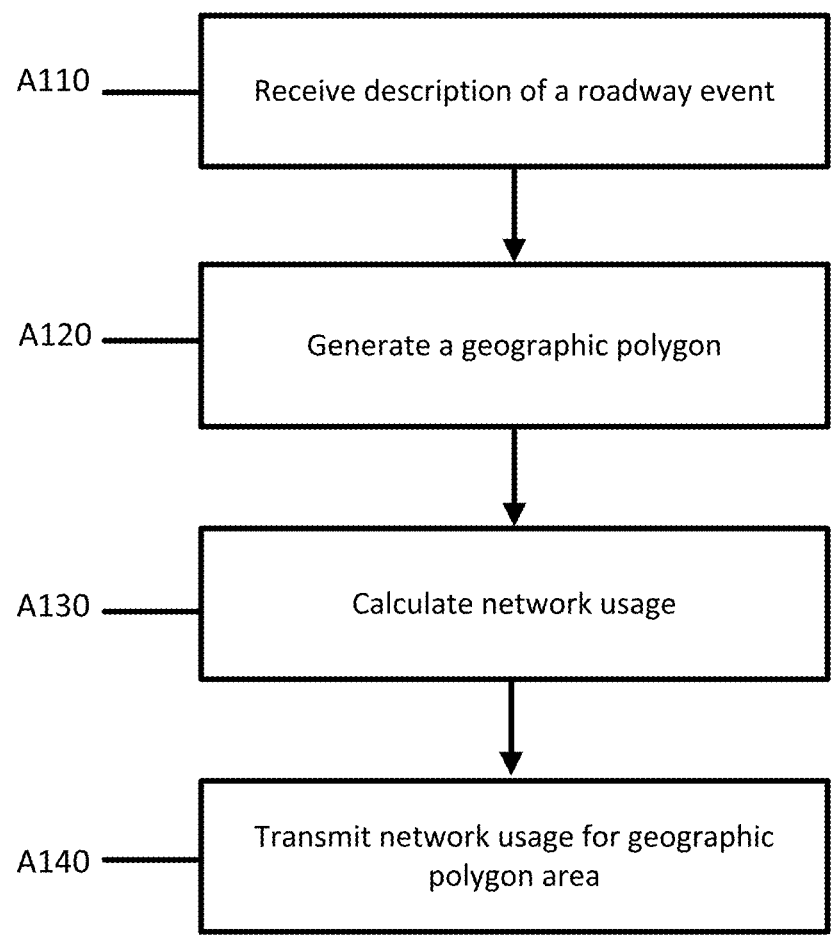
FIG. 6 illustrates an example workflow for optimizing a wireless network.

FIG. 6 illustrates a flow chart of a method for wireless network optimization. As presented in the following sections, the acts may be performed using any combination of the components indicated in FIG. 2. The following acts may be performed by the cellular system 129, the location cloud 121, or a combination thereof. Additional, different, or fewer acts may be provided. The acts are performed in the order shown or other orders. The acts may also be repeated.

At act A110, the location cloud 121 receives a description of a roadway event or incident through the network 127. The roadway event may include a roadway description, description of the incident and or road condition, a roadway location, and a time. Roadway events may be determined from a variety of sources. The roadway event may originate with an end user manual input, an automated response from the collection device(s) 122 such as a probe or sensor. A device 122 may be configured to collect data from multiple sources to create a roadway event. A vehicle (or device(s) 122 integrated into vehicles) may transmit data regarding their operation or roadway conditions over the network. Remote sensing, such as aerial or satellite photography may be used to collect information. Field personal may report roadway conditions that may be collected automatically or manually. Roadway events may be collected from social networks or from other internet based sources. A device 122 may also be used as one or more probes or sensor(s) to collect roadway data. Roadway events may include a roadway location (from GPS, navigational device, mobile devices, or other devices that may collect positional data) and a time of the event (or a time of transmission).

A roadway event may be derived or predicted from received information. Increased traffic congestion may be predicted based on an increase in a number of routes that specify a roadway segment or node. For example, the location cloud 121 may provide routing services to one or more devices. The location cloud 121 may predict based on the requested or received routes that a road segment may see abnormal traffic. Connected devices 122 may for example transmit routes to the location cloud 121. The collected routes may be analyzed to determine any future abnormal traffic pattern. Any abnormal traffic pattern may lead to (or be) a roadway event. Other abnormal traffic patterns, for example for a special event (concert, sporting event, etc.), may be predicted by the location cloud 121 without receiving a description of a roadway event from a device. Descriptions of a roadway event received from a device or sensor may be used to supplement or fine tune descriptions of event generated from routing or special event data.

Figure 7:
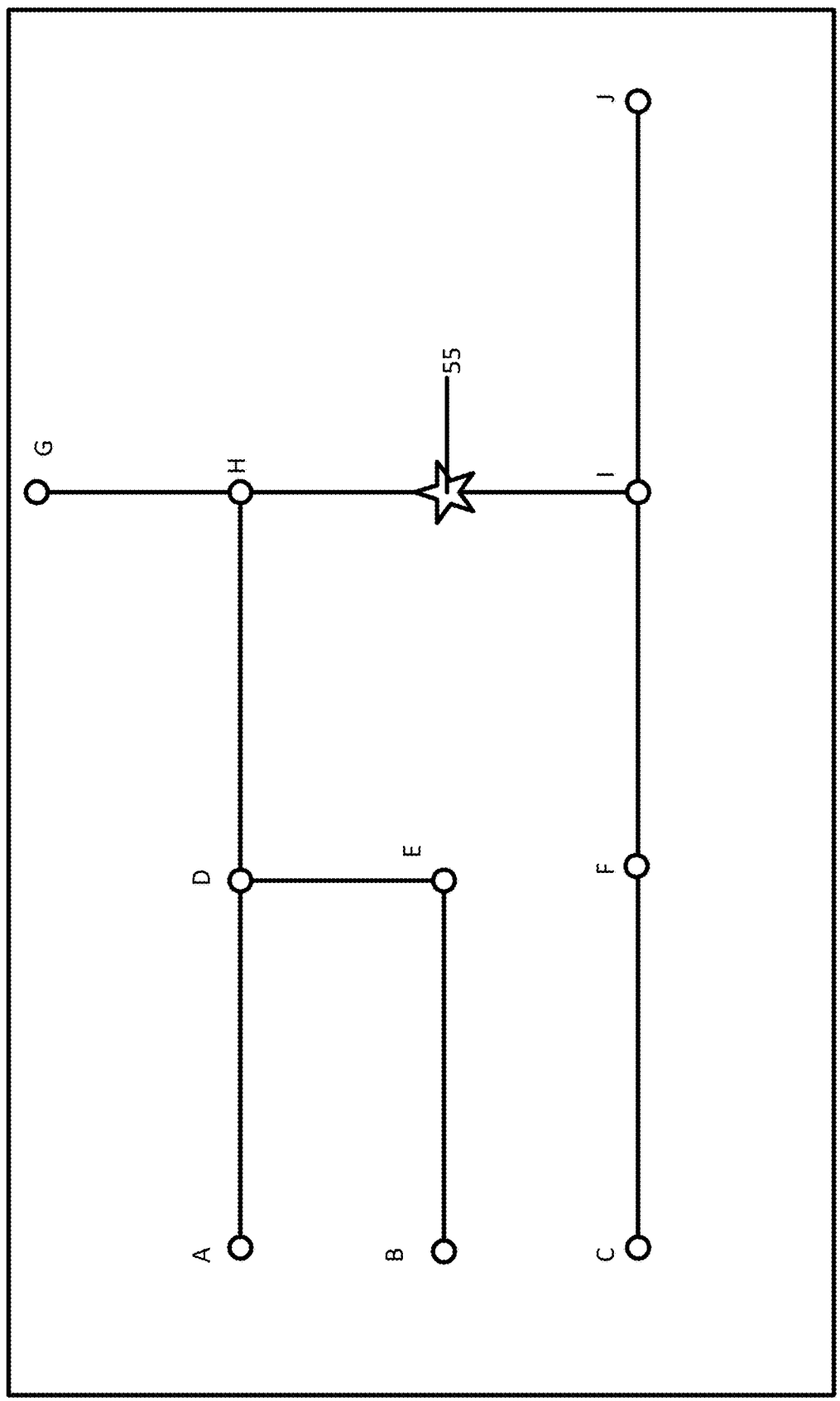
FIG. 7 illustrates a map of an example roadway event.

FIG. 7 illustrates an example roadway event at location 55. FIG. 7 includes a roadway network including nodes A through J. FIG. 7 also includes road segments that are identified by the nodes at either end, for example road segment AD is the road segment illustrated between nodes A and D; road segment DH is the road segment between nodes D and H; and so on. The roadway event occurs at location 55. The roadway event 55 may be for example, a construction event or an accident. The roadway event 55 may be detected or identified and or communicated by a device 122 or sensor. The description of the roadway event may be generated by collected data from multiple devices or sensors. For example, vehicles on road segments HI, DH, and GH may all report slower than typical speeds. The roadway event 55 may be derived from the combination of the reports. A description of a roadway events may include a wide range of road information, from accidents, weather conditions, obstructions to congestion and delays. Roadway descriptions may also deal with public transport from rail, bus to air traffic and ferry services. Other roadway events or roadway descriptions might include: vehicular operation (such as brake lights, slowing of speed, windshield wiper operation, or other vehicular sensors monitoring the vehicle's operation), construction, accidents, roadway closures, roadway congestion, roadway speeds, roadway surface condition, roadway environmental condition, roadway traversal energy information (for use in green routing applications), or other 'non-normal' roadway conditions. The descriptions may reference current conditions or prior conditions.

At act A120, the location cloud 121 generates a geographic polygon based on the description. The geographic polygon may be based on an impact area that is derived from current and historical flow data and probe based analytics stored in the database. The impact area may include any areas that are predicted to have altered traffic patterns or congestion due to the traffic incident. The location cloud 121 may identify an impact area for the incident. From the impact area, the location cloud 121 may generate the geographic polygon (also referred to as a polygon).

The roadway description may be an update to a previously received event, such as an updated event with current description of vehicular operation (potentially including a current speed). Each roadway event is classified as either relating to a previous incident or a new incident. Multiple roadway events may be classified as relating to a single incident. For example, the location cloud 121 may receive multiple events regarding an accident, from visual (images) to audio to reports indicating that multiple vehicles have slowed. The events may be collected from different sources over a period of time. The location cloud 121 processes each event to determine if the event relates to a current ongoing incident. Each additional event that is related to the ongoing incident is part of the incident information flow and may affect an impact area or geographic polygon as the incident evolves over time.

In addition to receiving events from different sources, the location cloud 121 may receive multiple events from a single source. In such an example, a new event may update a previously received event. For example, a first event may indicate that a vehicle is slowing or stopped. A second event received subsequently from the same vehicle may indicate that the vehicle is moving at an expected speed. Depending on the information included, a subsequent event may indicate that an incident has passed and that network usage has returned to normal operation. In other embodiments, subsequent events are used by the location cloud 121 to evolve or update an impact area as explained below.

The location cloud 121 may use data from multiple events as mentioned above. The location cloud 121 may also analyze data regarding weather conditions, road conditions, current traffic conditions, and historical traffic conditions. The historical traffic conditions may also include prior event data. The impact area is generated by looking at current and historical traffic conditions and comparing how events affect the surrounding roadway network. For example, a previous event (such as an accident) may have affected the road segment where the accident occurred, but also may have affected multiple other surrounding areas. The impacted area may also be affected by the time of day, the weather conditions, among other factors.

The impact area may only be identified for areas when an alteration of the traffic pattern exceeds a threshold level. For example, there may be thousands to millions of traffic incidents that cause minor traffic pattern alterations. A single vehicle that slows at a location may cause a slight increase in congestion for a time period. If the congestion does not increase or decrease above or below a threshold level, the incident may be temporarily ignored. Minor incidents may be combined to determine a larger incident that exceeds the threshold levels. A threshold level for an increase in congestion may be determined by a percentage or by a predetermined level of congestion. For example, a road segment may have levels of congestion designated at each 100 vehicles (100, 200, 300, 400 . . . ). A threshold increase or decrease may be set at the increase or decrease crossing multiple levels. For example, an increase from the 100 to 200 level may not be identified as an impact, however, an increase from the 200 level to the 400 level may represent an impacted road segment. Alternative schema for determining a threshold may be used.

The location cloud 121 may use analytics to generate a geographic polygon ("polygon") based on the roads that will be impacted by the incident. The polygon may be an outline of the impact area. The polygon may be a collection of road segments that are impacted by the incident (e.g. at least partially in the impact area). The polygon may be described using geographic coordinates such as latitude and longitude. The polygon may be a closed shape including three or more straight lines. The polygon may be a circle or oval.

Figure 8:
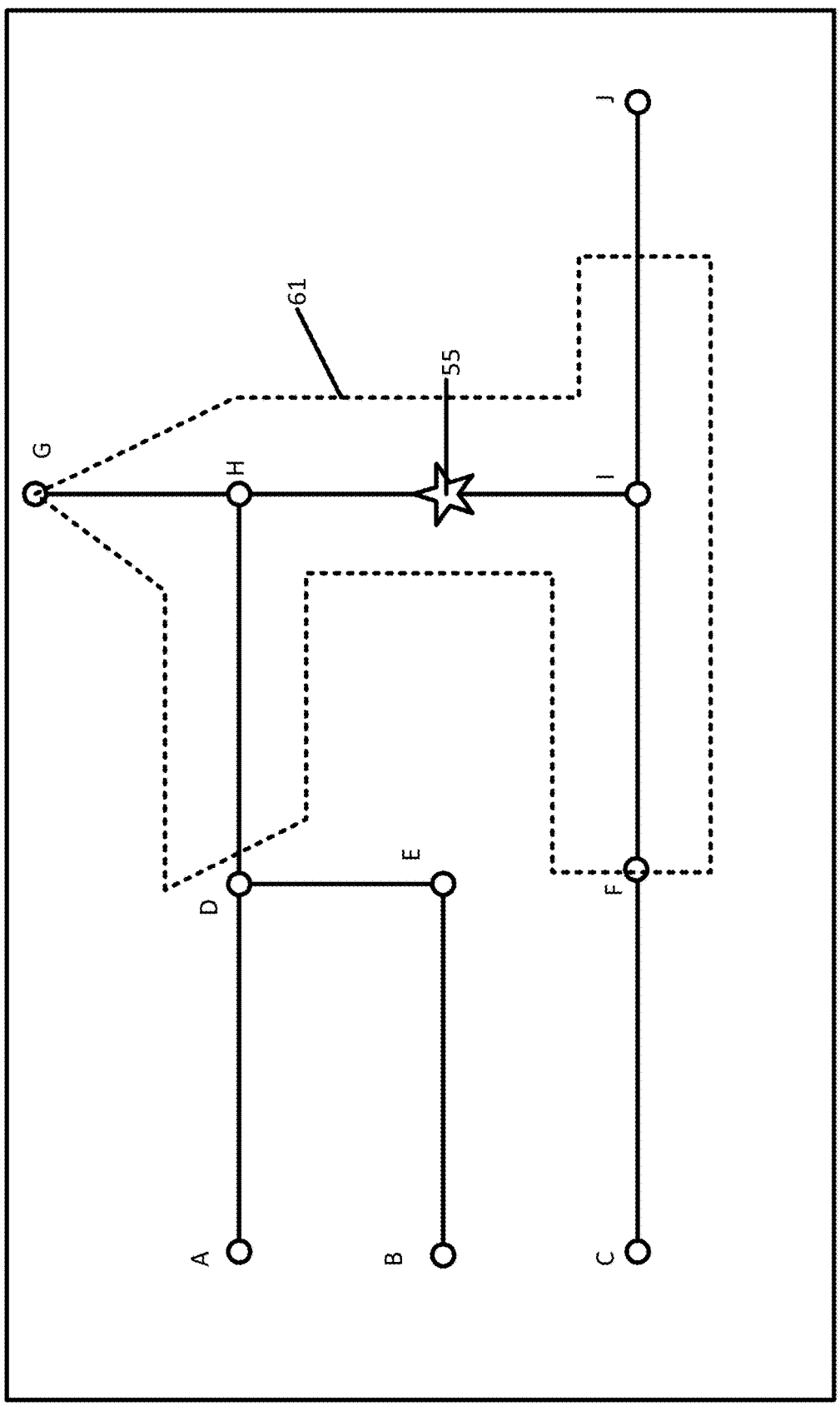
FIG. 8 illustrates an example geographic polygon for the event of FIG. 7.

FIG. 8 illustrates a geographic polygon 61 for the incident 55 of FIG. 7. For the example incident in FIG. 7, the location cloud 121 may determine that segments DH, GH, HI, IF, and IJ may be affected for a certain time period. The generated polygon 61 in FIG. 8 illustrates the area that may see increased or decreased traffic flow or congestion as a result of the incident. The polygon 61 may be a simple representation of an area that has altered traffic flow or congestion. Multiple polygons may be used to specify the type of alteration. A first polygon, for example, may represent an area with a first level of increased congestion. A second polygon may represent an area with a second level of increased congestion. A third polygon may represent an area with a first level of decreased congestion. The levels of increased or decreased traffic effects may be stored at the road segment level. For example, for the polygon 61 in FIG. 8, the data may be stored as DH (1), GH (4), HI (6), IF (8), and IJ (4) using a notation of [segment (traffic congestion increase)]. Alternative schemes for storing the polygon and related data may be used.

In certain embodiments, more than one polygon may be generated for the incident. The location cloud 121 may, for example generated multiple polygons for an incident that describe the impact over time. The location cloud 121 may generate multiple polygons that describe different levels of impact as a result of the incident. For example, the polygon illustrated in FIG. 8 may represent the area that has any decreased or increased congestion. One or more different polygons may be generated that represent the areas with different levels of increases. For example, a smaller polygon may be generated that represents an area that is more affected by the incident than outlying areas (or, for example, the major roadways that include more traffic to start with and may have a greater increase in congestion).

As additional events are received by the location cloud 121, the polygon is shaped in real time based on incident information flow. Each additional event within the information flow that is related to an incident is filtered and processed. The information from each additional event may be used to adjust an impact area. For example, a traffic congestion incident may worsen over time. The initial event may indicate that a certain area will be affected. However, as additional events from other vehicles are received and analyzed, the impacted area may evolve over time. A larger or smaller area may be affected. In certain embodiments, even without additional events, the impact area may be altered over time. Using historical data, the location cloud 121 may predict the evolution of an incident without additional real-time inputs of data. For example, a traffic congestion incident at a known intersection at a certain time under certain road and weather conditions may dissipate at a known rate based on historical data. The location cloud 121 may predict that the incident may affect an outlying road segment, but only for a limited amount of time. The polygon will include that road segment initially, but the polygon may evolve over time and subsequent generated polygons may not cover the road segment or cell.

Figure 9A:
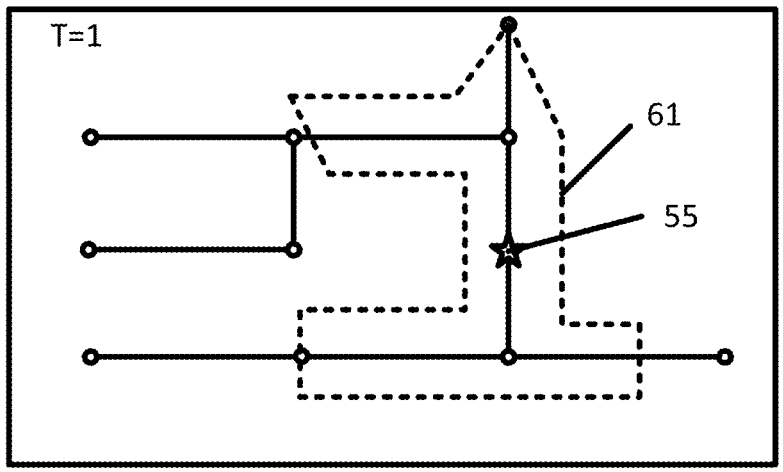
FIGS. 9A, 9B, and 9C illustrate an evolution of the geographic polygon of FIG. 8.
Figure 9B:
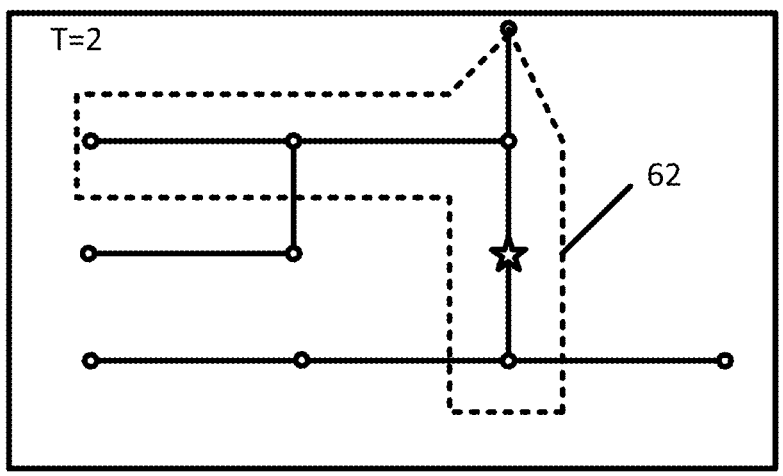
Figure 9C:
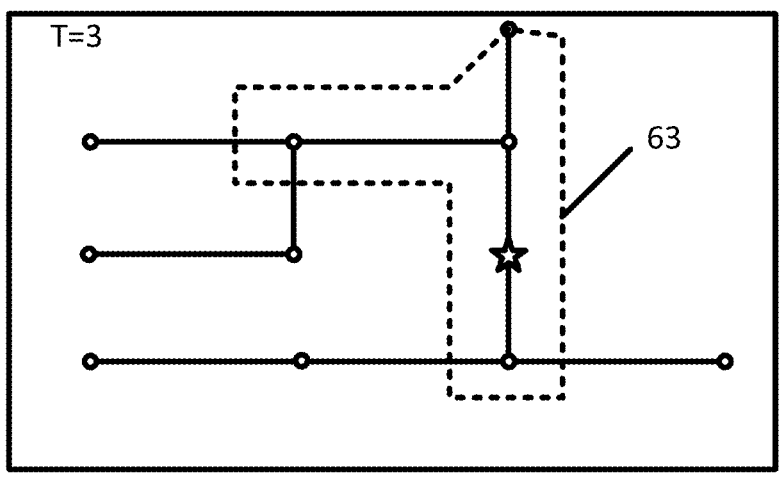

FIGS. 9A, 9B, and 9C illustrate an evolution of the polygon 61 of FIG. 8 over time (T=1,2,3). FIG. 9A illustrates a first polygon 61 generated as a result of the incident at location 55. The polygon 61 includes segments DH, GH, HI, IF, and IJ as defined by the nodes of FIGS. 7 and 8.

At a subsequent time, a second polygon 62 is generated with an updated impact of the incident. The second polygon is depicted in FIG. 9B. Segments IF and IJ have returned to a normal traffic flow while segment AD has been added to the polygon 62. The second polygon 62 may be generated as a result of receiving a second description of the traffic incident. The second polygon 62 may also be generated as a result of machine learning or predictions made from similar historical traffic incidents. If a similar incident has occurred at the location 55 at a similar time, the second polygon 62 may be generated from actual previous data. If there has not been a similar incident at the location 55 at a similar time, the location cloud 121 may estimate the result based on other incidents at similar locations. Additional real time information received from devices 122 in the area may also affect the size of the polygon as the polygon is updated.

At a subsequent time, a third polygon 63 is generated with an updated impact of the incident. The third polygon 63 is depicted in FIG. 9C. The segment AD that was affected in FIG. 9B has now returned to normal traffic flow. The segments DH, GH, and HI still remain affected at this time. Additional polygons may be generated until the effect of the incident has subsided.

In order to generate the one or more polygons, the location cloud 121 uses historical as well as real-time traffic and incident data. The data provides an element of predictive analytics around creation of a polygon. Historical traffic data (e.g. speed or flow or volume) may be stored within the database alongside each road segment or node. Each road segment may contain historical traffic data for each of weather conditions, road conditions, or time of day. The traffic data for each segment may be updated as new data is processed. To decrease latency for computing the polygon, segments may be grouped into classifications depending on the segments their historical traffic patterns or common attributes. For example, certain road segments that are similar may share a common profile instead of having separate historical profiles. Other data beyond traffic data for road segments or nodes may also be used as historical data. Historical traffic patterns and flow volume may also be stored for road segments or geographic locations. Historical traffic data may also be saved, archived or organized event by event (or incident by incident). For example, a roadwork warning in a certain location may be a repeatable event for not only that location but also other similar locations. The events and the subsequent impacts may be stored in the database to be used both as models for specific locations and also as models for similar events occurring at different locations.

Driver tendencies may also be used to provide additional information that could influence the predicted analytics and subsequent impact area generated from said data. For example, different drivers in different regions or countries make different decisions when confronted with certain obstacles or conditions. The decisions may be stored and used to predict how an impact area may evolve over time.

The polygon may be shaped by the presence of alternative routes. Traffic flow may be modelled based on the historical data, but also may depend on alternatives routes or bypasses. If there is an alternative route, the impact area of an incident may be smaller, and may dissipate quicker than if there are no alternative routes. Further, the location cloud 121 may take into account how many vehicles are guided by navigation systems (that might affect the routing of those vehicles). For example, vehicles that received traffic alerts may be more likely to take an alternative route that in turn may alter the shape of the polygon over time.

The polygon may be created using the map database and the road segments and nodes contained within the database. The polygon may be created using a geographic coordinate system such as latitude and longitude. For example, the boundary of the polygon may be described using geographic coordinates. The polygon may also be described using a set or list of road segments or nodes. The polygon may extend for a certain distance along a road segment (possibly with an offset from a starting node). The polygon may be a combination of two or more areas that overlap. The polygon may include both directions of a roadway or just a single direction. The polygon may exclude areas such as parking lots or other areas that are not affected.

Once polygons are created, the polygons can be archived for future use to reduce latency around analytics necessary to generate said polygon. A polygon may be saved once a correlation is made between the incident and location. The evolution of the polygon over time may also be archived and used in future predictions.

In certain embodiments, the polygon may be stored with the associated impact on traffic. For example, for each road segment or polygon, the increased or decreased level of congestion or traffic flow may be identified and stored in the database.

The location cloud 121 may be configured to identify a plurality of events and determine the impact the events. For example, two distinct traffic events may overlap in their impact area. The combined impact of both events may affect the total impact. A first event may cause congestion on a roadway. A second event may alter the impact pattern of the first event. The combined impact may be different that either the first or second impact separately. A polygon may be generated for each event and stored. When both event occur during the same time period, a third polygon may be generated that combines the effects of the first and second events.

At act A130, an estimated network usage (or load) is calculated for the geographic polygon based on the description. The estimated network usage may be calculated by the cellular system 129 or the location cloud 121. The location cloud 121 may, for example, transmit the impact area to the cellular system 129 that may then be compared with cellular coverage to determine which cells are affected. The cellular system 129 may use historical and/or real time network usage data to determine the effect of the incident on network usage. In certain embodiments, the location cloud 121 may receive and store historical network usage data from the cellular system 129. The location cloud 121 may estimate current and future network usage using the traffic data and the historical network usage data. The estimated network usage may be a value relating to the estimated network usage or an indication of an increase or decrease in network usage (e.g. bandwidth or connected devices).

The estimated network usage may be proportional to the number and type of connected devices 122 in the impact area. The number and type of devices 122 may be calculated using an identified number of vehicles in the area (for example by extrapolating the total number of vehicles and connected devices 122 based on the number of sensor devices or detected devices). The number of identified vehicles may correlate with a total bandwidth. The location cloud 121 or the cellular system 129 may generate the estimated network usage using historical network information that relates to a number of vehicles or connected devices 122 in an area.

In certain embodiments, one or more profiles of the connected devices 122 may be used to estimate the network usage. Certain device types or users may generate more or less bandwidth. A bus for example may, as a result of carrying multiple devices, may use much more bandwidth than a single passenger vehicle. The location cloud 121 or cellular system 129 may store usage profiles for one or more of the connected devices 122. The usage profiles may be used to estimate the network usage granularly or by, for example, sorting the connected devices 122 into groups that related to averaged out bandwidth usage. The bus in the example above, may be included in a group that exhibits very high bandwidth usage. A mobile phone may be included in a group that exhibits low bandwidth. A mobile phone for a user that streams high levels of video may be included in a group for medium bandwidth usage.

Figure 10:
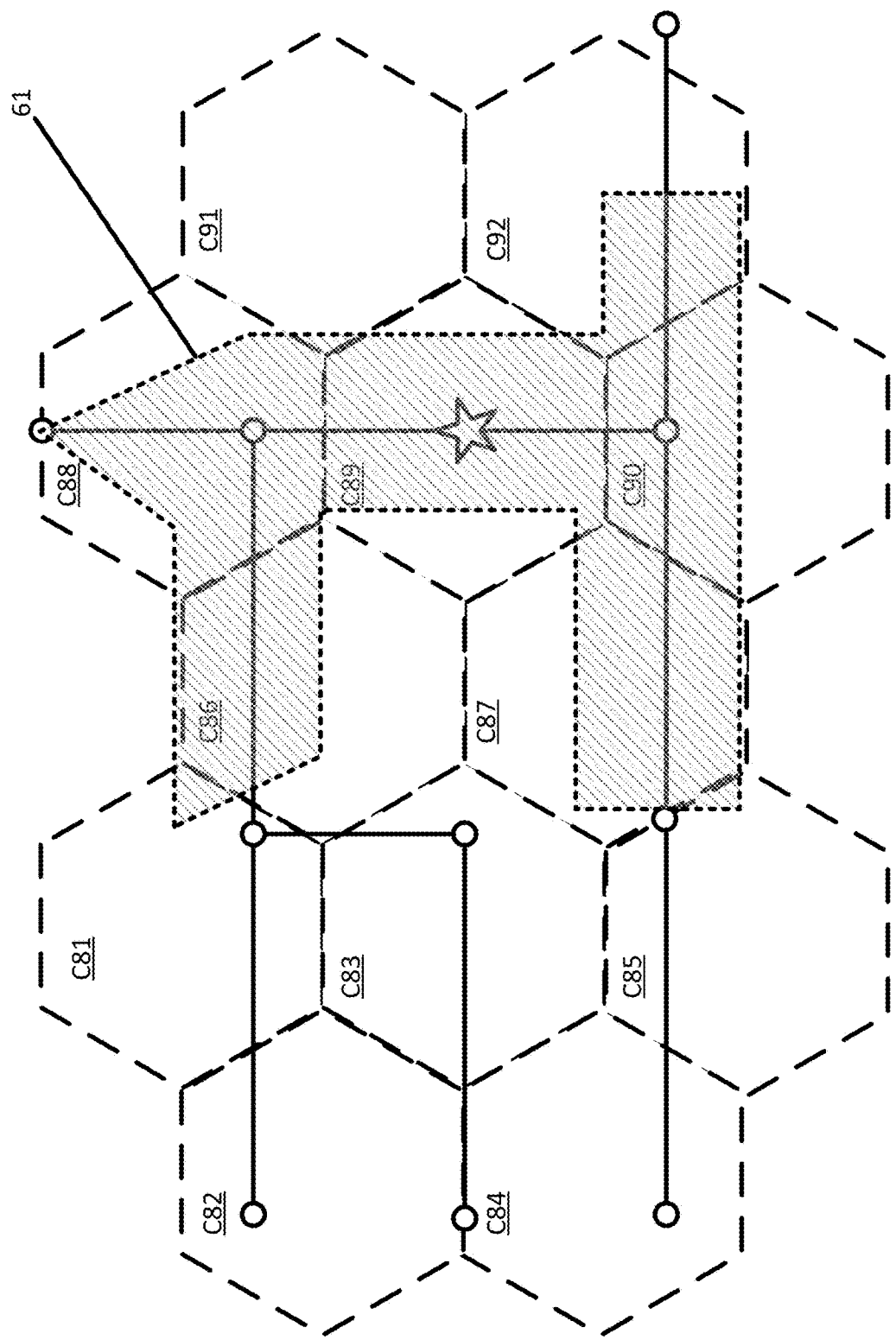
FIG. 10 illustrates an example of a geographic polygon overlaid on a cellular network map.

FIG. 10 illustrates an example of the geographic polygon overlaid on a cellular network map. FIG. 10 includes the roadway network illustrated in FIGS. 7 and 8. FIG. 10 overlays the roadway network and the geographic polygon to a cellular map that contains cells C81-C92. Each of the cells may include at least one transmitter or base station. In certain embodiments, the cellular map may include transmitter ranges for each of the cells. A map may include the range of each transmitter over a geographic area. The map may include the range of one or more base transceiver stations (BTS) or one or more connected Evolved UMTS Terrestrial Radio Access Network (E-UTRAN) Node B stations.

Each cell (base station) may be configured to transmit and receive data from the devices 122 within range of the base station. The cells C81-C92 in FIG. 10 are shown as hexagonal shapes. There may be overlap between the cells. As a device 122 travels from one cell to an adjacent cell the communications may be handed off between base stations. The size and range of the cells may vary with locational requirements or obstructions. Each cell may have a maximum throughput, load, or bandwidth for transmitting and receiving data.

The estimated network usage may be assigned to individual cells of a cellular network. The geographic polygon may be overlaid on a cellular map to determine which cells will be impacted by the incident. The change in congestions or number of connected devices 122 for each connected cell may then be derived from the traffic data.

The cellular map may have been previously generated or received from a cellular system 129. The cellular map may be generated by a cell boundary generator. The cellular map may be a geographic map that indicates the coverage area for each individual cell. Different wireless providers may have different cellular maps. For example, a first provider may use different towers than a second provider and as such have different coverage maps. The location cloud 121 may overlay the polygon on each individual cellular map. The cells that include a part of the polygon may be affected by the incident. There may be a threshold for how much overlap is required to specify a cell as impacted. For example, the polygon may have to cover at least a predetermined threshold amount of the cell. The predetermined threshold amount may be 5%, 10%, 50% or another value between 0 and 1.

As shown in FIG. 10, the cells affected by the geographic polygon include C86, C87, C88, C89, and C90. The geographic polygon covers a portion of cell C92, but not enough to cover, for example, a 50% threshold level. In certain embodiments, a certain percentage of the cell may be required to be covered to be identified as affected. The level of increase congestion may also be taken into consideration for determining if a cell is affected. In the example of FIG. 10, if congestion was predicted to increase drastically in the portion of cell C92, then cell C92 may be identified as impacted.

The estimated network usage may be calculated from the increased or decreased traffic data. Additional vehicles or devices 122 in an area may correspond to additional network usage. In certain areas, the network usage may be primarily affected by the number of vehicles in the area. For example, a cell that covers a section of highway may only transmit to a few devices other than either connected vehicles or connected devices 122 that are in or related to the vehicles. In other areas, connected vehicles or connected devices 122 that are in or related to the vehicles may make up a smaller percentage of the total device but still may be responsible for any increase or decrease. For example, a cell in an urban area may transmit with office workers or pedestrians. The number of devices may not fluctuate that far from normal due to the ebb and flow of pedestrians. However, the number of devices may increase dramatically if the number of vehicles (that still only make up a small portion of the connected devices) increase.

The increased or decreased traffic data may be generated when the geographic polygon is generated. The estimated network usage may be calculated directly using historical or current traffic. The estimated network usage may be calculated using historical network usage data. Network usage may be tracked over time for each cell. The network usage may then be stored and compared against events that occurred. The historical network usage and associated events may then be used to predict or estimate current or future network usage for the area.

In certain embodiments, the estimated network usage may vary separately from the geographic polygon. The geographic polygon may be a single input among many in the calculated of the estimated network usage. For example, the estimated network usage may be used to generate a load balancing scheme that shifts downloads or transmission of data to different cells. As such, a new or updated estimated network usage may be generated for both the original and newly affected areas (e.g. cells).

The cellular map and the effect on each of the cells may be stored in the database for each type, location, and timing of an incident.

At act A140, the estimated network usage is transmitted to a MNO. A MNO may be responsible for managing a wireless network. In certain embodiments, the estimated network usage may be compared to a baseline network usage. The cells or areas that exceed the baseline network usage may be reported to the mobile network operator. The amount that the affected cells or areas are estimated to exceed the normal operations may also be transmitted. The mobile network operator may perform preemptive moves to guarantee data service levels necessary to meet peak demands.

In certain embodiments, the MNO may request that connected devices 122 that are expected to enter the affected cells to perform tasks that may limit the connected device's 122 exposure to the affected cells. The connected devices 122 may, for example request and receive map data ahead of time. The connected devices 122 may buffer a video or audio track. The connected devices 122 may attempt to connect to an alternative method for transmission such as a local Wi-Fi station or a different cellular provider.

In certain embodiments, an autonomous vehicle may take action when the affected cells are identified. The autonomous vehicle may avoid the area if the affected cell cannot guarantee transmission to the autonomous vehicle. As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

Autonomous or highly automated driving vehicle may require high definition up to date maps. Bandwidth requirements for servicing an autonomous vehicle or HAD may be high relative to the normal usage of a connected device 122. Without the high definition maps, the autonomous vehicle may not be able to operate efficiently. The high definition maps may be downloaded ahead of time, however, environments change, and downloading a map too far ahead of time may lack certain features that have changed. The closer to a feature or roadway segment that the map is downloaded, the more likely the map is up to date. However, due to the bandwidth requirement, in the case of a traffic incident, if every vehicle attempted to download a high definition map, the cell's peak bandwidth may be achieved. Using the estimated network usage, a cellular system 129 or a location cloud 121 may request that one or more vehicles download the maps from a cell that is not currently affected by an increase in congestion. The cellular system 129 or location cloud 121 may spread out the downloads over multiple cells for multiple vehicles to lessen the load on any individual cell of the wireless network.

Figure 11:
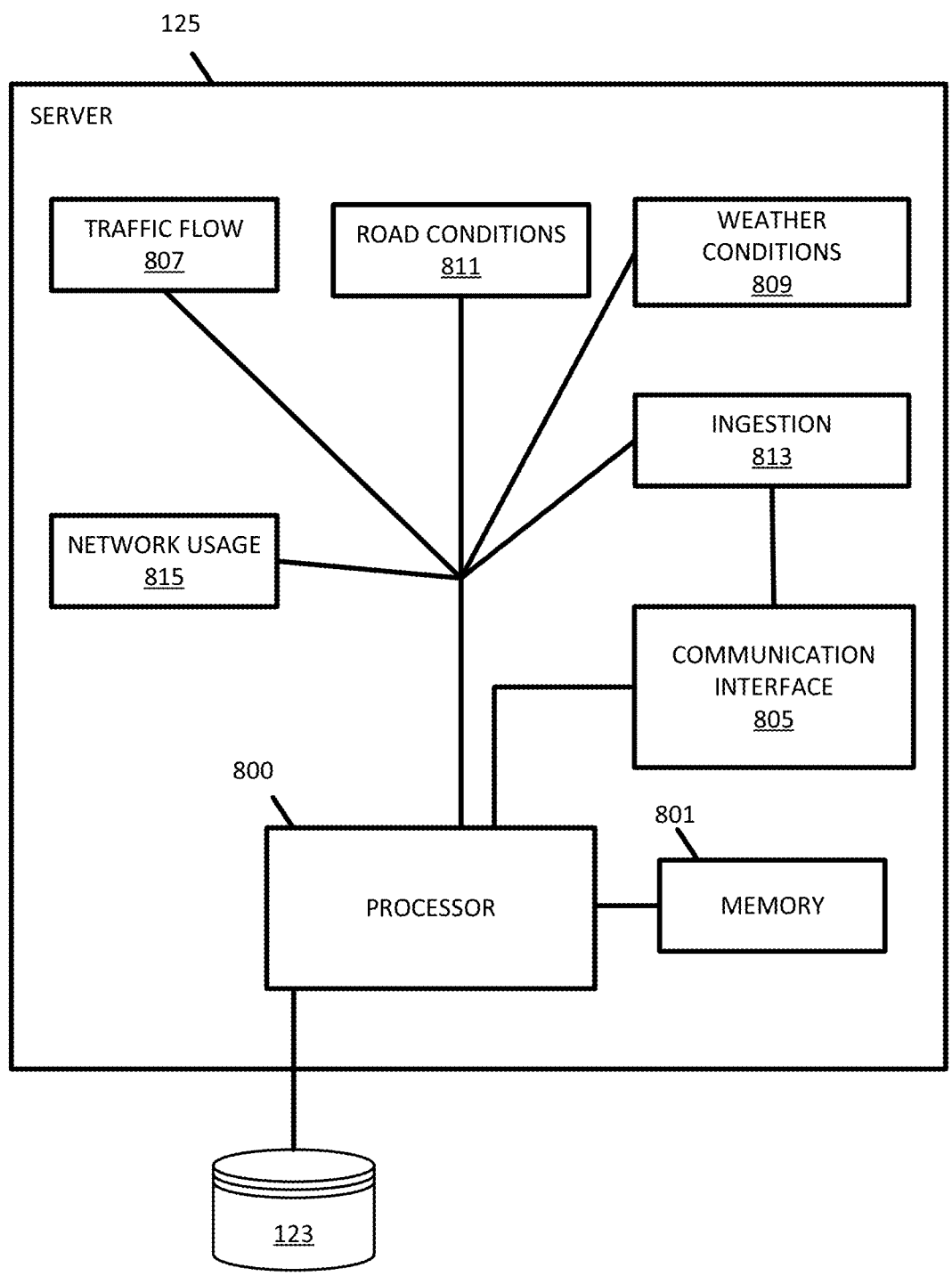
FIG. 11 illustrates an example location cloud of FIG. 2.

FIG. 11 illustrates an example location cloud 121 of FIG. 1. The location cloud 121 includes a server 125 and a database 123. The server 125 may include a sensor incident ingestion module 813, real-time and historical traffic flow and incidents module 807, a weather module 809, a road conditions module 811, a network usage module 815, a processor 800, a communications interface 805, and a memory 801. The processor 800 is connected to the database. Each of the modules may be included within the processor 800. Each of the modules may also be connected to the database in order to access current and historical geographical and network usage data.

The server 125 and associated modules are configured to receive an event message using the communications interface 805. The event message may include a description of an incident. The server 125 and the modules are configured to generate an impact area of the incident using current and historical traffic data stored in memory 801 and the database 123. The server 125 is configured to generate a geographic polygon based on the impact are of the incident. The server 125 is configured to identify the effect the incident has on the network usage in the impacted area. The server 125 may be configured to transmit the geographic polygon or the network usage to a MNO or one or more device(s) 122 located within the geographically using the communication interface 805. The server 125 may be configured to generate an updated impact area for a later time period. The server 125 may be configured to generate an updated geographic polygon and identify the effect the incident has on the network usage at the later time period. The server 125 may be configured to communicate the network usage and preemptive measures to one or more connected devices 122.

The processor 800 may include one or more of the sensor incident ingestion module, the real-time and historical traffic flow and incidents module, weather module, and/or road conditions module. The processor 800 may be the means to receive collected data from the device(s), determine an event, and generate an impact area and incident event. The processor 800 may be configured to request and receive data through the communication interface. The processor 800 may also be configured to access the database including current and historical data. The processor 800 may be configured to use the geographic maps to generate a precise impact area.

The real-time and historical traffic data and incidents module 807 (or traffic module) may be the means for modeling current and future traffic data in an area based on historical data, incident events, and other road event data. The traffic module 807 may store current and future traffic data predictions for later use to decrease latency if future similar incidents occur. The traffic module 807 may estimate or predict the traffic impact of incidents or events.

The weather module 809 receives and processes weather data. The weather module 809 may collect weather data from sensors such as in-vehicle sensors, other on-ground sensor, weather services, or third party sources. The weather module 809 may generate messages regarding weather conditions at specific locations such as fog (low visibility), rain, snow, wind, among others.

The road conditions module 811 receives and processes road condition data. The road conditions module 811 may collect road condition data from sensors such as in-vehicle sensors, field personal, third party sources, or other collection apparatus or services. The road conditions module 811 may generate alters regarding road conditions such as icy roads, flooding, certain construction issues, among others.

The sensor incident ingestion module 813 may be configured to collect or ingest data from one or more collection devices or other sources using the communications interface 805. The sensor incident ingestion module may be configured to determine if an event is part of an ongoing incident or if the event is a new incident.

The network usage module 815 may be configured to identify a network load for one or more cells of a cellular network. The network load may relate to bandwidth or a number of connected devices. The network usage module 815 may collect and store network usage data received from connected devices 122 or a cellular system 129. The network usage module 815 may be the means for estimating current or future network usage based on traffic data and historical and current network usage for one or more impacted cells of a cellular network.

Figure 12:
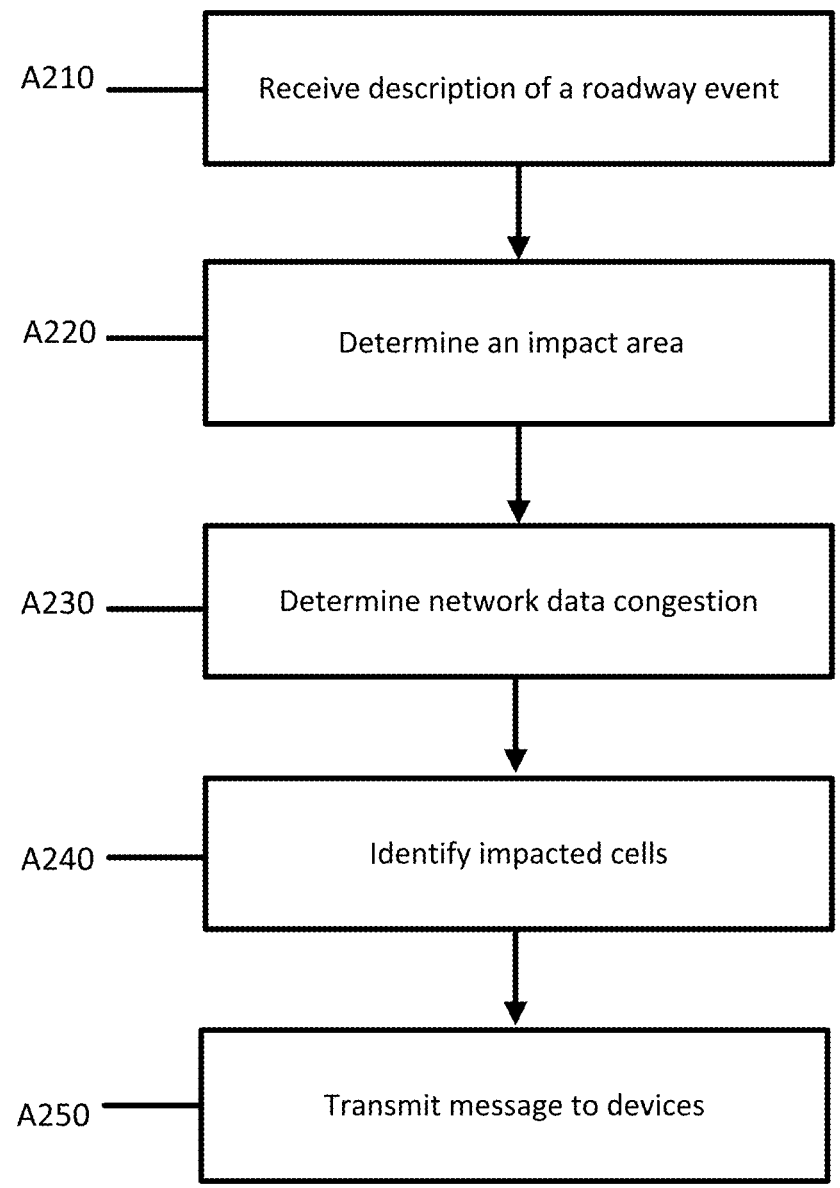
FIG. 12 illustrates an example workflow for optimizing a wireless network.

FIG. 12 illustrates an example workflow for optimizing network transmissions using the location cloud 121 of FIG. 11. As presented in the following sections, the acts may be performed using any combination of the components indicated in FIG. 2. The following acts may be performed by the cellular system 129, the location cloud 121, or a combination thereof. Additional, different, or fewer acts may be provided. The acts are performed in the order shown or other orders. The acts may also be repeated.

At act A210 a description of an incident is received. The incident may be a traffic incident such as an accident, a roadway condition, or any other traffic event. An incident in the future may be predicted using information relating to route requests, routes or expected positions received from connected devices, special events, information derived from social media, or other navigations applications. The description may be received from one or more devices 122 or sensors that monitor a roadway network. Multiple reports may be generated by the one or more devices 122 or sensors that relate to a single incident. The description of the incident may be generated from the multiple reports.

At act A220 an impact area of the incident is determined based on the first description. The impact area may be generating using a combination of current and historical traffic data cross referenced with previously received descriptions of similar incidents. The impact area may be generated using routing information for vehicles on a roadway network. The impact area may be defined by a geographical polygon that includes the area or areas that have areas that are impacted by the traffic. The impact area may include one or more road segments, one or more nodes, and/or one or more partial road segment. The impact area may also include areas adjacent to road segments or nodes.

One or more impact areas may be generated for the incident. For example, multiple impact areas may be generated for different time period for a single incident. Each impact area may correspond to an estimated impact at a certain point, e.g. the time of the incident (T), T+15 minutes, T+30 minutes, T+45 minutes, and so on. Alternative time periods may be used depending on the nature and type of the incident and the subsequent impact.

At act A230, a network data congestion level is determined for the impact area. The network data congestion level may relate to a current level of network congestion or a future estimated level of network congestion. Historical network data may be collected and stored. Network data may include data relating to a number of connected devices 122, the usage of the connected devices 122, and/or the total capacity of one or more base stations or cellular towers. The historical network data and the traffic data may be used to determine a network data congestion level. The traffic data may predict an increase in congestion or traffic flow in the impact area. The congestion or traffic flow may indicate an increase in connected devices 122 (more vehicles may indicate more connected vehicles or personal devices associated with or in the vehicles) or the use of the connected devices 122 (unexpected events may cause an increase in requests for information from the connected devices 122). A profile or type for the connected devices 122 may be identified and used to determine an estimated bandwidth level. The estimated bandwidth level (or data congestion level) may be compared to a threshold level. The threshold level may be determined by a magnitude of change in congestion or bandwidth predicted by the impact area. For example, an impact area may indicate an increase of congestion, but not to a level that would affect the wireless network. Alternatively, a minor increase in an already congested impact area may satisfy the threshold.

At act A240, one or more cells of a cellular network that are associated with the network data congestion level change are identified. The one or more impact areas may correspond to one or more cells of a cellular network. A cellular network may include one or more cells that transmit and receive data to and from connected devices 122. Each cell may include one or more base stations that have a range for transmission. The range of each cell may be mapped and overlaid on a roadway network to identify the cells that correspond to the impact area.

Figure 13:
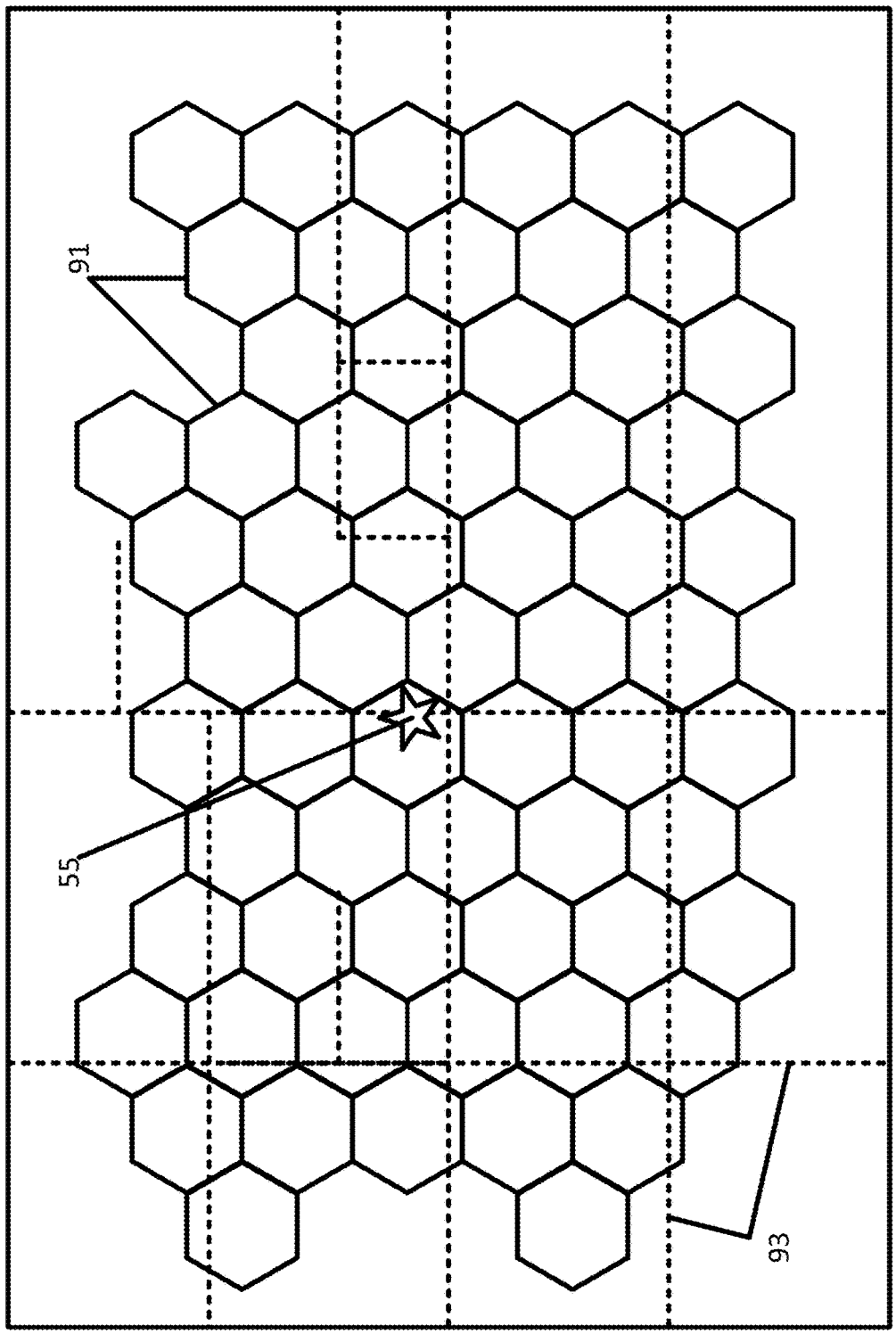
FIG. 13 illustrates an example cellular map and an example event.

FIG. 13 illustrates a cellular map 91 including multiple cells overlaid on a roadway network 93, the roadway designated by the dotted lines. An event occurs at location 55. An impact area and/or geographic polygon may be generated from the description of the event at act A220. The impact area may represent an area at a current time or future time where the traffic flow or congestion has been altered from a normal state by the event. The impact area may be derived from historical traffic data for similar events. Traffic data for events may be collected as the events occur and then stored in a database. Using the stored data, the traffic flow and congestion for current and future events may be predicted using machine learning. The network data congestion level may be determined at act A230. Alternatively, one or more cells may be identified that relate to the impact area and then the network data congestion level is determined for the one or more cells.

Figure 14A:
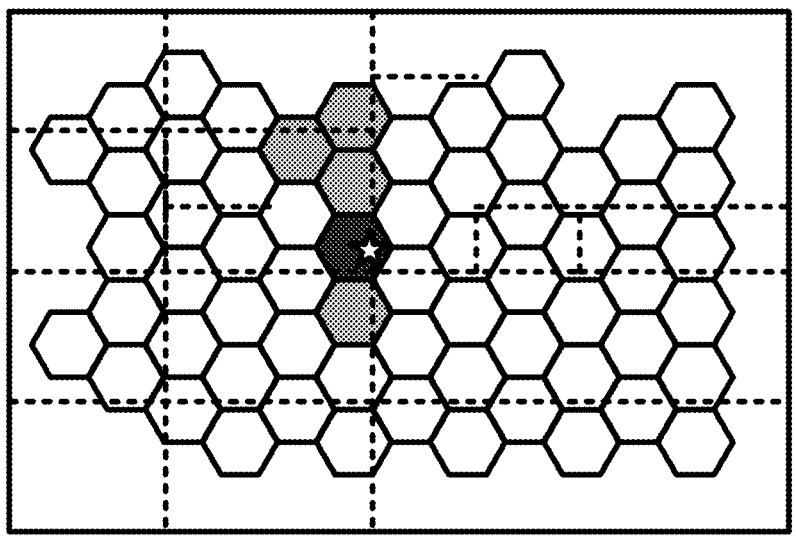
FIGS. 14A, 14B and 14C illustrate example network usage maps.
Figure 14B:
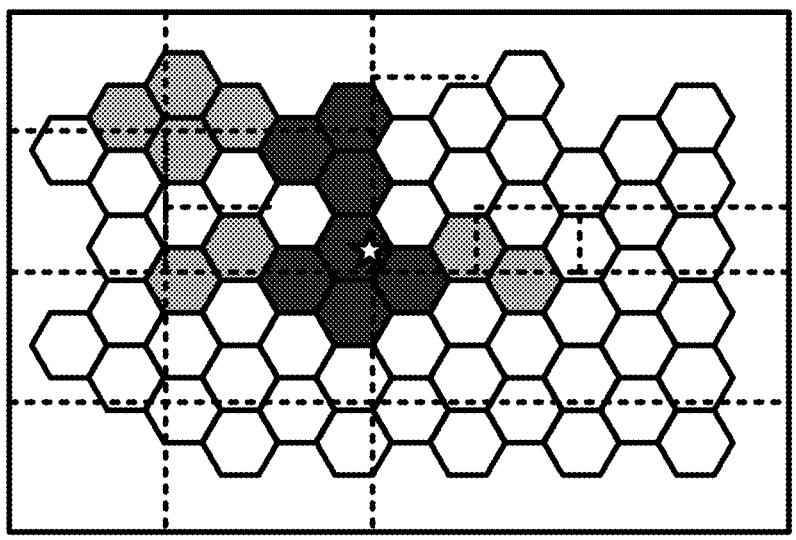
Figure 14C:
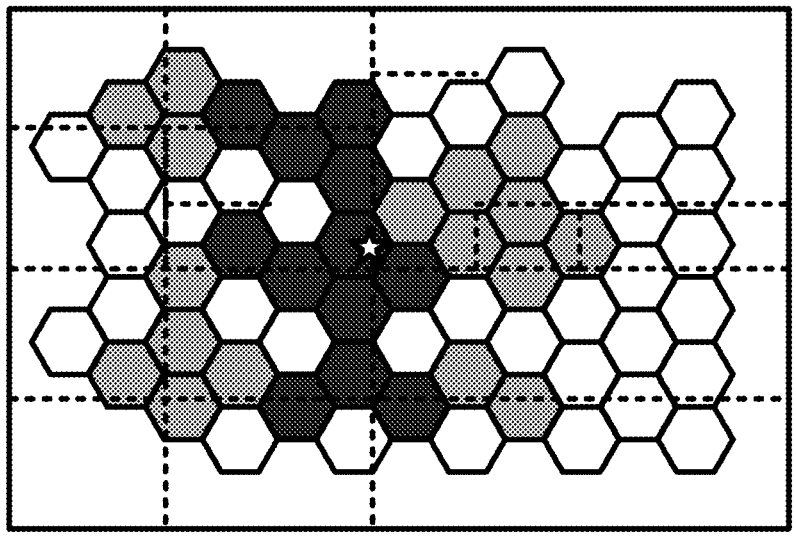

FIGS. 14A, 14B, and 14C illustrate three network maps for multiple cells as a result of a traffic incident. The sequence of how the estimated network usage changes may be stored in the database. FIG. 14A depicts a smaller area including four cells that are impacted by the incident in FIG. 13. For one cell, colored black, the network data congestion is highly impacted by the incident. As the event evolves over time, the geographic polygon may change shape and as such, the overlay on the cellular map may change the affected cells. Each cell may be affected differently. FIGS. 14B and 14C depicts three different levels of change. FIGS. 14B and 14C depict how the incident in FIG. 13 grows to include more and more cells. The incident may impact the data congestion level for cells in a different way. For example, a major increase in congestion. Certain cells may only see a minor increase in congestion. Other cells may see a decrease in congestion. The network maps illustrated in FIGS. 14A, 14B, and 14C track the way an incident impacts the cells of a cellular network. The network maps may be stored with the incident description and any related traffic information that is used to predict the increase or decrease in congestion. The stored maps may be used later to assist in analyzing future events.

Each of the cells may include a threshold level of bandwidth. A determination that the threshold level is not met may indicate that the particular cell is not impacted enough to generate a message below at act A250. The cell may then be determined to not be impacted even though there is a change in congestion (either traffic or data). The threshold may be a percentage of the maximum bandwidth. For example, a cell that has a maximum capacity of 100 Mb/s may be determined to be impacted only if the estimated usage rises above 80 Mb/s. Alternatively, even if the estimated usage rises from, for example, 20 Mb/s to 40 Mb/s (a 100% gain), the cell may not be determined to be impacted because there is no risk of exceeding the capacity and degrading of wireless service.

At act A250, a message is transmitted to one or more devices 122 predicted to enter the one or more cells. The one or more devices 122 may correspond to one or more vehicles on the roadway network. The routes of the one or more vehicles may be identified. In certain embodiments, the routes may have been generated and transmitted to the devices 122 by a navigation system or the location cloud 121. Devices 122 may receive instructions to preemptively download or access data through a cell that is not impacted or less impacted than other cells.

Figure 15:
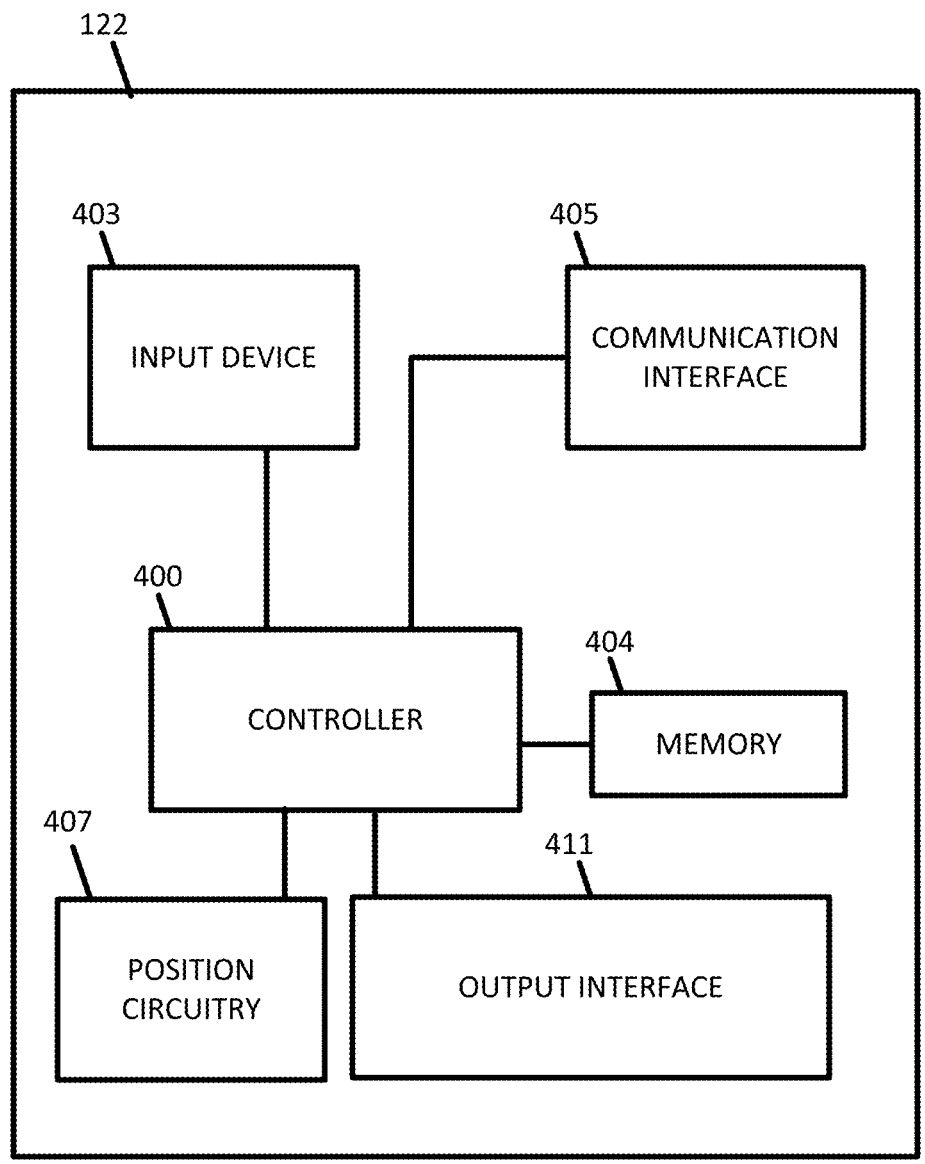
FIG. 15 illustrates an example device of FIG. 2.

FIG. 15 depicts an example device 122 configured to optimize a wireless network. The device 122 may be the means for transmitting and receiving traffic related data. The device 122 may be configured to generate or receive a route and display the route for a user. The device 122 includes an input device 403, a communications interface 405, a controller 400, a memory 404, position circuitry 407, and an output interface 411. The device 122 may be configured to receive a network congestion message from a cellular system 129 or location cloud 121. The device 122 may be configured to take preemptive actions relating to wireless usage such as buffering or preemptively downloading maps, traffic or transportation related data.

The memory 404 and/or memory 801 may be a volatile memory or a non-volatile memory. The memory 404 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card. The memory may contain a locally stored map database.

The controller 400 and/or processor 800 may include a general processor, digital signal processor, an application specific integrated circuit (ASIC), field programmable gate array (FPGA), analog circuit, digital circuit, combinations thereof, or other now known or later developed processor. The controller 400 and/or processor 300 may be a single device or combinations of devices, such as associated with a network, distributed processing, or cloud computing. The controller 400 may be configured to receive position information from the positioning circuitry 407 and identify when and where to download or buffer data.

The positioning circuitry 407, that is an example of a positioning system, is configured to determine a geographic position of the device 122. The positioning circuitry may use, for example, a GPS receiver to determine the location of the device 122. The positioning circuitry may include movement circuitry. The movement circuitry, that is an example a movement tracking system, is configured to determine movement of a device 122. The position circuitry 407 and the movement circuitry may be separate systems, or segments of the same positioning or movement circuitry system. In an embodiment, components as described herein with respect to the device 122 may be implemented as a static device.

The input device 403 may be one or more buttons, keypad, keyboard, mouse, stylist pen, trackball, rocker switch, touch pad, voice recognition circuit, or other device or component for inputting data to the device 122. The input device 403 and the output interface 411 may be combined as a touch screen, that may be capacitive or resistive. The output interface 411 may be a liquid crystal display (LCD) panel, light emitting diode (LED) screen, thin film transistor screen, or another type of display. The output interface 411 may also include audio capabilities, or speakers.

The communication interface 405 and/or communication interface 805 may include any operable connection. An operable connection may be one in which signals, physical communications, and/or logical communications may be sent and/or received. An operable connection may include a physical interface, an electrical interface, and/or a data interface. The communication interface 405 and/or communication interface 805 provides for wireless and/or wired communications in any now known or later developed format. The communication interface 405 and/or communication interface 805 may include a receiver/transmitter for digital radio signals or other broadcast mediums. A receiver/transmitter may be externally located from the device 122 such as in or on a vehicle. The communications interface 405 may be configured to receive instructions from a MNO or cellular provide relating to buffering or downloading information. The communications interface 405 may receive information relating to network congestion at one or more cells.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for optimizing a wireless network, the method comprising:
    receiving a first description of a traffic incident;
    predicting an estimated traffic flow pattern for a first time period as a result of the traffic incident based on the first description, current traffic flow, and historical traffic flow;
    determining a first geographic area based on an effect of the estimated traffic flow pattern on the current traffic flow;
    generating a first geographic polygon based on the first geographic area;
    estimating a first future level of wireless network usage in the first geographic polygon as a result of the traffic incident; and
    transmitting the first future level of wireless network usage to a mobile network operator.

2. The method of claim 1, wherein determining the first geographic area comprises:
    predicting an altered traffic pattern resulting from the traffic incident using current traffic and historical traffic information; and
    determining the first geographic area where a current traffic pattern is affected by the altered traffic pattern.

3. The method of claim 2, wherein the altered traffic pattern comprises increased vehicle congestion.

4. The method of claim 2, wherein the first geographic area comprises one or more road segments.

5. The method of claim 2, wherein predicting the altered traffic pattern further uses one or more current weather conditions.

6. The method of claim 1, further comprising:
    transmitting map data to one or more devices predicted to enter the first geographic polygon.

7. The method of claim 1, wherein estimating the first future level of wireless network usage comprises:
    overlaying the first geographic polygon on a cellular map;
    identifying one or more cells from an overlap of the first geographic polygon and the cellular map;
    determining a change in a congestion of the one or more cells based on the estimated traffic flow pattern; and
    determining a change in bandwidth for the congestion in the one or more cells.

8. The method of claim 1, further comprising:
    receiving a second description of the traffic incident, wherein predicting the estimated traffic flow pattern is based on the first description and second description.

9. The method of claim 1, further comprising:
    generating a second geographic polygon covering a second geographic area affected by the traffic incident for a second time period;
    estimating a second future level of wireless network usage for the second geographic polygon; and
    transmitting the second future level of wireless network usage to a mobile network operator;
    wherein the second time period is later than the first time period; and
    wherein the first geographic polygon is different than the second geographic polygon.

10. The method of claim 9, wherein the first geographic polygon corresponds to a first plurality of cells of a cellular network and the second geographic polygon corresponds to a second plurality of cells of the cellular network.

11. The method of claim 9, wherein the traffic incident is a traffic event on a road segment of a roadway network.

12. The method of claim 11, wherein the first geographic polygon corresponds to a first plurality of road segments of the roadway network and the second geographic polygon corresponds to a second plurality of road segments of the roadway network.

13. The method of claim 9 wherein the first geographic area and second geographic area are areas that have increased traffic congestion as a result of the traffic incident.

14. The method of claim 1, wherein estimating the first future level of wireless network usage in the first geographic polygon as a result of the traffic incident comprises:
    identifying a historical number of connected devices in the first geographic polygon; and
    estimating a predicted number of connected devices for the first time period in the first geographic polygon based on the estimated traffic flow pattern.

15. A non-transitory computer readable medium including instructions that when executed are operable to:
    receive a description of a traffic incident;
    predict an estimated traffic flow pattern for a time period as a result of the traffic incident based on the description, current traffic flow, and historical traffic flow;
    determine a geographic area based on an effect of the estimated traffic flow pattern on current traffic flow;
    generate a geographic polygon covering the geographic area;
    predict a future level of estimated wireless network usage in the geographic polygon based on the estimated traffic flow pattern in the geographic polygon; and
    transmit the future level of estimated wireless network usage to a mobile network operator.

16. A system for optimizing a wireless network, the system comprising:
    a receiver configured to receive a description of a traffic incident;
    a processor configured to predict an estimated traffic flow pattern for a time period as a result of the traffic incident based on the description, current traffic flow data, and historical traffic flow data, determine a geographic area based on an effect of the estimated traffic flow pattern on current traffic flow, generate a geographic polygon based on the geographic area, and estimate based on the estimated traffic flow pattern in the geographic polygon, a future level of wireless network usage in the geographic polygon as a result of the traffic incident; and a transmitter configured to transmit the future level of wireless network usage to a mobile network operator.

\* \* \* \* \*